(12) United States Patent
Katayama

(10) Patent No.: US 11,552,366 B2
(45) Date of Patent: Jan. 10, 2023

(54) TECHNIQUE FOR SUPPLYING ELECTRIC POWER FROM BATTERY PACK TO ELECTRIC WORKING MACHINE

(71) Applicant: MAKITA CORPORATION, Anjo (JP)

(72) Inventor: Junichi Katayama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 420 days.

(21) Appl. No.: 16/731,164

(22) Filed: Dec. 31, 2019

(65) Prior Publication Data

US 2020/0235357 A1    Jul. 23, 2020

(30) Foreign Application Priority Data

Jan. 22, 2019   (JP) .............................. JP2019-008572

(51) Int. Cl.
*H01M 50/20*   (2021.01)
*H01M 50/209*   (2021.01)
*B25F 5/02*   (2006.01)

(52) U.S. Cl.
CPC ............. *H01M 50/209* (2021.01); *B25F 5/02* (2013.01); *H01M 2220/30* (2013.01)

(58) Field of Classification Search
CPC .................................................. H01M 50/209
See application file for complete search history.

(56) References Cited

U.S. PATENT DOCUMENTS

| 2013/0025893 | A1  | 1/2013  | Ota et al. |
| 2014/0151079 | A1  | 6/2014  | Furui et al. |
| 2014/0159662 | A1  | 6/2014  | Furui et al. |
| 2014/0159919 | A1  | 6/2014  | Furui et al. |
| 2014/0159920 | A1  | 6/2014  | Furui et al. |
| 2018/0076639 | A1  | 3/2018  | Furui et al. |
| 2019/0181418 | A1* | 6/2019  | Son ..................... H01M 50/569 |
| 2019/0334357 | A1  | 10/2019 | Furui et al. |

FOREIGN PATENT DOCUMENTS

| JP | 5616104 B2 | 10/2014 |
| JP | 6392116 B2 | 9/2018 |

* cited by examiner

*Primary Examiner* — Olatunji A Godo
(74) *Attorney, Agent, or Firm* — Oliff PLC

(57) ABSTRACT

One aspect of the present disclosure provides a power source controller including a first battery pack connector, a working machine connector, and a power supply control device. The first battery pack connector is configured to be coupled to a first battery pack including a rechargeable battery. The working machine connector is configured to be detachably coupled to an electric working machine driven by an electric power of the first battery pack. The power supply control device is configured to supply the electric power of the first battery pack to the electric working machine in response to fulfillment of a first condition. The power supply control device is configured to transmit a dummy command signal to the first battery pack in response to fulfillment of a second condition.

16 Claims, 14 Drawing Sheets

TECHNIQUE FOR SUPPLYING ELECTRIC POWER FROM BATTERY PACK TO ELECTRIC WORKING MACHINE

CROSS-REFERENCE TO RELATED APPLICATIONS

The present application claims the benefit of Japanese Patent Application No. 2019-008572 filed on Jan. 22, 2019 with the Japan Patent Office, the entire of which is incorporated herein by reference.

BACKGROUND

The present disclosure relates to a technique for supplying an electric power from a battery pack to an electric working machine. Japanese Patent No. 6392116 discloses a power source controller (adapter) disposed between a battery pack and an electric working machine so as to provide additional functionality (such as a communication function).

Japanese Patent No. 5616104 discloses a power source controller (connection adjuster) that enables a connection between a battery pack and an electric working machine having different connection forms. This power source controller includes a battery pack connector connected to the battery pack, and a working machine connector connected to the electric working machine.

The power source controller performs transmission and reception processes of various signals that are transmitted and received between the electric working machine and the battery pack.

SUMMARY

However, in a case where the power source controller is used, responsiveness of the electric working machine may decrease as compared to a case where the battery pack and the electric working machine are directly coupled.

For example, the length of time for processing the signals in the power source controller (signal process time) is added to the length of time from when a command signal is outputted from the electric working machine until when the command signal reaches the battery pack via the power source controller and a signal, transmitted in response (a response signal) from the battery pack, reaches the electric working machine via the power source controller. Due to the addition of the signal process time, a response time from the output of the command signal until supply of an electric power to the electric working machine becomes longer, resulting in a possible decrease of responsiveness of the electric working machine.

In this case, since the length of time from manipulation of a trigger switch of the electric working machine by a user until driving of the electric working machine becomes long, a usability of the electric working machine to users may decrease.

Accordingly, it is desirable that one aspect of the present disclosure provides a technique that can inhibit a decrease of responsiveness of an electric working machine driven by an electric power of a battery pack.

One aspect of the present disclosure provides a power source controller including a first battery pack connector, a working machine connector and/or a power supply control device.

The first battery pack connector is configured to be coupled to a first battery pack including a rechargeable battery. The working machine connector is configured to be detachably coupled to an electric working machine. The electric working machine is configured to be driven by an electric power of the first battery pack. The power supply control device is configured to supply the electric power of the first battery pack to the electric working machine in response to fulfillment of a first condition. The first condition is fulfilled in response to (i) the rechargeable battery being in a dischargeable state, and (ii) the power supply control device having received a power supply command signal from the electric working machine. The power supply control device is configured to transmit a dummy command signal to the first battery pack in response to fulfillment of a second condition. The second condition is fulfilled in response to the first battery pack being coupled to the first battery pack connector. The dummy command signal imitates the power supply command signal.

The power supply control device is configured to transmit the dummy command signal to the first battery pack in response to the first battery pack being coupled to the first battery pack connector. In other words, the power supply control device is configured to transmit the dummy command signal to the first battery pack in response to the first battery pack being coupled to the first battery pack connector irrespective of whether the electric working machine is coupled to the working machine connector.

The power source controller can acquire the result of determination whether the first battery pack is in the dischargeable state before receiving the power supply command signal from the electric working machine. Accordingly, the power source controller can output the state of the first battery pack (whether the first battery pack is in the dischargeable state) to the electric working machine in response to the power source controller having received the power supply command signal from the electric working machine without performing an inquiry process with respect to the first battery pack.

That is, after receiving the power supply command signal, the power source controller does not need the time for making an inquiry with respect to the first battery pack, which in turn shortens the length of time from receipt of the power supply command signal until the output of the state of the first battery pack to the electric working machine.

Thus, the power source controller can inhibit a decrease of responsiveness of the electric working machine and a decrease of operability of the electric working machine to its users, even if the power supply control device is disposed between the first battery pack and the electric working machine.

The condition under which the dummy command signal is outputted according to the present disclosure is "when the first battery pack is coupled to the first battery pack connector", which includes both "when the electric working machine is coupled to the working machine connector" and "when the electric working machine is not coupled to the working machine connector".

The power supply control device may be configured to continue to transmit the dummy command signal in response to fulfillment of the second condition.

Accordingly, even when the state of the first battery pack (specifically, the rechargeable battery) changes, the power source controller can acquire the result of determination corresponding to the state of the first battery pack after the change. For example, even if the first battery pack is in the dischargeable state immediately after being coupled to the first battery pack connector, the state of the first battery pack may change to the non-dischargeable state due to some factor(s) such as the subsequent power consumption and the temperature condition. Even in this case, the aforementioned power source controller can acquire the result of determination corresponding to the latest state of the first battery pack by continuing to transmit the dummy command signal.

The power supply control device may be configured to stop transmitting the dummy command signal in response to a change in state of the first battery pack from the dischargeable state to a non-dischargeable state.

That is, it is not so much necessary to inquire the state of the first battery pack (specifically, the rechargeable battery) immediately after a change in state. Thus, the power source controller can reduce a processing load in the power supply control device by stopping the transmission of the dummy command signal.

The power supply control device may be configured to, upon stop of transmission of the dummy command signal, resume the transmission of the dummy command signal in response to an elapse of specified waiting time.

After changing to the non-dischargeable state, the state of the first battery pack may change to the dischargeable state as time passes. Thus, the power source controller can check whether the state of the first battery pack has been changed back to the dischargeable state by transmitting the dummy command signal after the elapse of the waiting time.

The above-described power source controller may further include a second battery pack connector configured to be coupled to a second battery pack including a rechargeable battery. The power supply control device may be configured to transmit the dummy command signal to both of the first battery pack and the second battery pack in response to fulfillment of a third condition. The third condition may be fulfilled in response to (i) the first battery pack being coupled to the first battery pack connector, and (ii) the second battery pack being coupled to the second battery pack connector.

That is, in a case where the power source controller is configured to be coupled to the first battery pack and the second battery pack, the power supply control device transmits the dummy command signal to both of the coupled first battery pack and the coupled second battery pack. Consequently, the aforementioned power source controller can acquire the results of determination with regard to both of the coupled first battery pack and the coupled second battery pack whether they are in the dischargeable state.

The power supply control device may be configured to transmit the dummy command signal to both of the first battery pack and the second battery pack in response to fulfillment of a fourth condition. The fourth condition may be fulfilled in response to (i) the first battery pack being coupled to the first battery pack connector and (ii) the second battery pack being coupled to the second battery pack connector under a circumstance where the dummy command signal is being transmitted to the first battery pack.

The power source controller is configured to transmit the dummy command signal to the second battery pack in response to the second battery pack being coupled to the second battery pack connector in a non-connected state. Accordingly, the power source controller can promptly acquire the result of determination whether the newly connected second battery pack is in the dischargeable state. Due to the aforementioned power source controller, the length of time required until power supply with the newly coupled second battery pack is performed can be shorten.

The power supply control device may be configured to selectively perform a parallel signal transmission process and a sequential signal transmission process. The power supply control device may be configured to concurrently transmit the dummy command signal to both of the first battery pack and the second battery pack in the parallel signal transmission process. The power supply control device may be configured to sequentially transmit the dummy command signal to the first battery pack and the second battery pack in the sequential signal transmission process.

That is, in the parallel signal transmission process, the power source controller can acquire both of the results of determination in a short period of time whether the first battery pack and the second battery pack are each in the dischargeable state. Moreover, in the sequential signal transmission process, the power source controller can acquire the results of determination whether the first battery pack and the second battery pack are each in the dischargeable state while inhibiting a significant increase of the process load in the power supply control device.

Another aspect of the present disclosure provides a power supply device including a power source controller and a first battery pack including a rechargeable battery.

The power source controller includes a first battery pack connector, a working machine connector, and/or a power supply control device. The first battery pack connector is configured to be coupled to the first battery pack.

The working machine connector is configured to be detachably coupled to an electric working machine. The electric working machine is configured to be driven by the electric power of the first battery pack.

The power supply control device is configured to supply the electric power of the first battery pack to the electric working machine in response to fulfillment of a first condition. The first condition is fulfilled in response to (i) the rechargeable battery being in a dischargeable state, and (ii) the power supply control device having received a power supply command signal from the electric working machine. The power supply control device is configured to transmit a dummy command signal to the first battery pack in response to fulfillment of a second condition. The second condition is fulfilled in response to the first battery pack being coupled to the first battery pack connector. The dummy command signal imitates the power supply command signal.

The power supply device can still inhibit the decrease of responsiveness of the electric working machine when the power source controller is used so as to supply the electric power with the first battery pack to the electric working machine. Thus, the power supply device can inhibit the decrease of responsiveness of the electric working machine when using the power source controller, and inhibit the decrease of operability of the electric working machine to its users.

Still another aspect of the present disclosure provides a job-site electric system including a power supply device and an electric working machine configured to be coupled to a working machine connector of a power source controller.

The power supply device includes the power source controller and a first battery pack including a rechargeable battery.

The power source controller includes a first battery pack connector, the working machine connector, and/or a power supply control device. The first battery pack connector is configured to be coupled to the first battery pack.

The working machine connector is configured to be detachably coupled to the electric working machine. The electric working machine is configured to be driven by the electric power of the first battery pack.

The power supply control device is configured to supply the electric power of the first battery pack to the electric working machine in response to fulfillment of a first condition. The first condition is fulfilled in response to (i) the battery being in a dischargeable state, and (ii) the power supply control device having received a power supply command signal from the electric working machine. The power supply control device is configured to transmit a dummy command signal to the first battery pack in response to fulfillment of a second condition. The second condition is fulfilled in response to the first battery pack being coupled to the first battery pack connector. The dummy command signal imitates the power supply command signal.

The job-site electric system can still inhibit the decrease of responsiveness of the electric working machine in a case where the power supply device includes the power source controller. Thus, in a case where the power source controller is used, the aforementioned job-site electric system can inhibit the decrease of responsiveness of the electric working machine, and the decrease of operability of the electric working machine to its users.

A still another aspect of the present disclosure provides a method for supplying an electric power of a battery pack to an electric working machine. The method includes coupling the battery pack and the electric working machine to a power source controller.

Moreover, the method includes supplying the electric power from the battery pack to the electric working machine through the power source controller in response to (i) the battery pack being in a dischargeable state, and (ii) the power source controller having received a power supply command signal from the electric working machine.

Furthermore, the method includes transmitting a dummy command signal from the power source controller to the battery pack in response to the battery pack being coupled to the power source controller. The dummy command signal imitates the power supply command signal.

According to the aforementioned method, the power source controller can acquire the result of determination whether the battery pack is in the dischargeable state before receiving the power supply command signal from the electric working machine. Accordingly, the aforementioned method enables the power source controller to output the state of the battery pack (whether the battery pack is in the dischargeable state) to the electric working machine in response to the power source controller having received the power supply command signal from the electric working machine without performing an inquiry process with respect to the battery pack.

That is, according to the aforementioned method, the power source controller, after receiving the power supply command signal, does not need the time for making an inquiry with respect to the battery pack, which in turn shortens the length of time from receipt of the power supply command signal until the output of the state of the battery pack to the electric working machine.

Thus, the aforementioned method enables the power source controller to inhibit a decrease of responsiveness of the electric working machine and a decrease of operability of the electric working machine to its users, even if the power source controller is disposed between the battery pack and the electric working machine.

BRIEF DESCRIPTION OF THE DRAWINGS

Some embodiments of the present disclosure will be described hereinafter by way of example with reference to the accompanying drawings, in which.

DETAILED DESCRIPTION OF EXEMPLARY EMBODIMENTS

It goes without saying that the present disclosure is not limited to embodiments below and may be carried out in various forms within the technical scope of the present disclosure.

1. First Embodiment

[1-1. Overall Configuration]

Figure 1A:
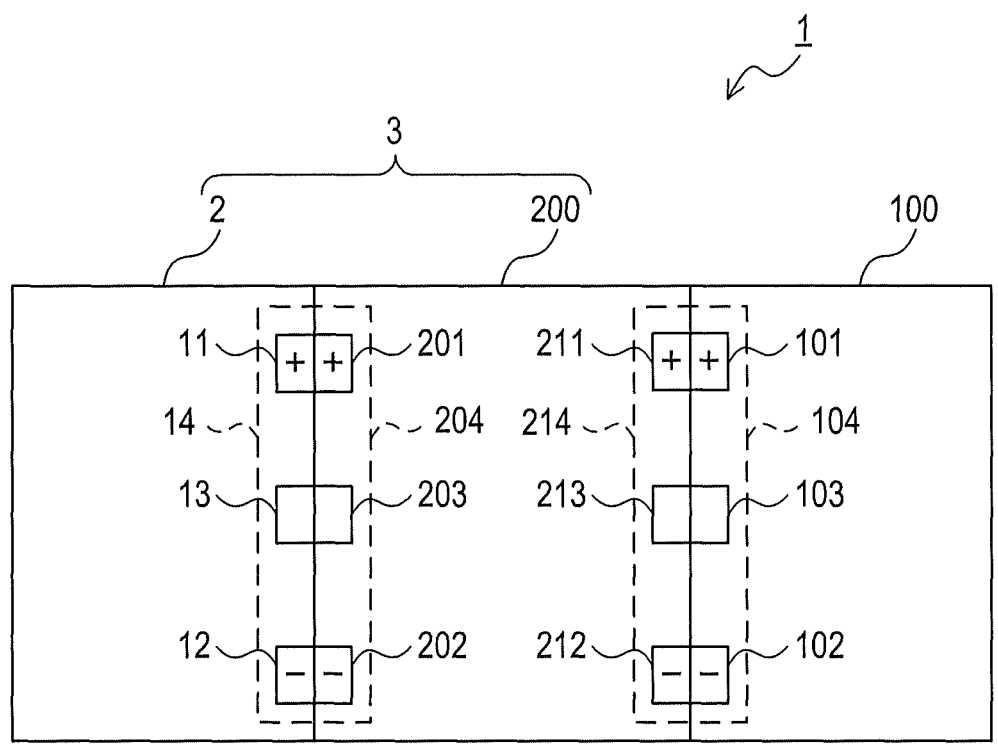
FIG. 1A is an explanatory diagram showing a schematic configuration of a job-site electric system according to a first embodiment.

As shown in FIG. 1A, a job-site electric system 1 according to a first embodiment includes a power supply device 3 and an electric working machine 100. The power supply device 3 includes a battery pack 2 and a power source controller 200.

The battery pack 2 is configured to be electrically coupled to the electric working machine 100 via the power source controller 200. The battery pack 2 is configured to supply an electric power accumulated in the battery pack 2 to the electric working machine 100. The battery pack 2 includes a positive terminal 11, a negative terminal 12, and a signal terminal 13. The positive terminal 11 and the negative terminal 12 are a pair of electric power terminals through which the electric power is supplied due to a discharge of the battery pack 2. Through the signal terminal 13, the battery pack 2 transmits and receives various signals.

Figure 1B:
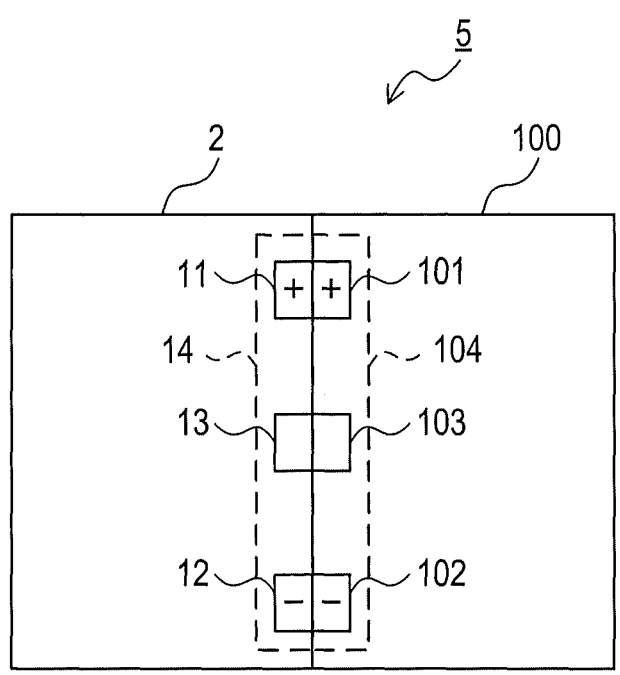
FIG. 1B is an explanatory diagram showing an electric working machine with a battery in which a battery pack and the electric working machine are directly connected.

The battery pack 2 includes an apparatus connector 14 configured such that the electric working machine 100 and the power source controller 200 are detachably coupled thereto. Thus, as shown in FIG. 1A, the battery pack 2 can be indirectly coupled to the electric working machine 100 via the power source controller 200 attached to the apparatus connector 14. Moreover, as shown in FIG. 1B, the electric working machine 100 can be directly coupled to the apparatus connector 14 without the power source controller 200. The positive terminal 11, the negative terminal 12, and the signal terminal 13 are disposed in the apparatus connector 14.

The electric working machine 100 includes a driving source such as a direct-current motor. Examples of the electric working machine 100 include a rechargeable (cordless) electric power tool, a rechargeable electric cleaner, a rechargeable electric gardening apparatus. The electric working machine 100 includes a positive terminal 101, a negative terminal 102, and a signal terminal 103. The positive terminal 101 and the negative terminal 102 are a pair of electric power terminals through which the electric power supplied from the battery pack 2 are received. Through the signal terminal 103, the electric working machine 100 transmits and receives various signals.

The electric working machine 100 includes an apparatus connector 104 configured such that the battery pack 2 and the power source controller 200 are detachably coupled thereto. Thus, it is possible to indirectly couple the electric working machine 100 to the battery pack 2 via the power source controller 200 attached to the apparatus connector 104, and it is also possible to directly couple the battery pack 2 to the apparatus connector 104 without the power source controller 200. The positive terminal 101, the negative terminal 102, and the signal terminal 103 are disposed in the apparatus connector 104. The electric working machine 100 can be driven by the electric power supplied from the battery pack 2.

Being interposed between the battery pack 2 and the electric working machine 100, the power source controller 200 can thereby provide additional functionality to the job-site electric system 1. The power source controller 200 can provide additional functionality such as a communication function and a diagnosis function. The communication function is for transmitting and receiving various information via wireless or wired communication between the battery pack 2 (or the electric working machine 100) and other apparatuses. The diagnosis function is for diagnosing whether the battery pack 2 and the electric working machine 100 are in a non-faulty state. Moreover, the power source controller 200 is provided with a function to transmit a dummy command signal to the battery pack 2 before a power supply command signal is transmitted from the electric working machine 100 to the battery pack 2.

The power source controller 200 includes a first positive terminal 201, a first negative terminal 202, a first signal terminal 203, a second positive terminal 211, a second negative terminal 212, and a second signal terminal 213.

The power source controller 200 includes a battery pack connector 204 configured such that the battery pack 2 is detachably coupled thereto, and a working machine connector 214 configured such that the electric working machine 100 is detachably coupled thereto. The first positive terminal 201, the first negative terminal 202, and the first signal terminal 203 are disposed in the battery pack connector 204. The second positive terminal 211, the second negative terminal 212, and the second signal terminal 213 are disposed in the working machine connector 214.

The positive terminal 11, the negative terminal 12, and the signal terminal 13 of the battery pack 2 are configured to be electrically connected respectively to the first positive terminal 201, the first negative terminal 202, and the first signal terminal 203 of the power source controller 200. The second positive terminal 211, the second negative terminal 212, and the second signal terminal 213 of the power source controller 200 are configured to be electrically connected respectively to the positive terminal 101, the negative terminal 102, and the signal terminal 103 of the electric working machine 100.

Accordingly, the power source controller 200 can supply the electric power supplied from the battery pack 2 attached to the battery pack connector 204 to the electric working machine 100 attached to the working machine connector 214.

[1-2. Battery Pack]

Figure 2:
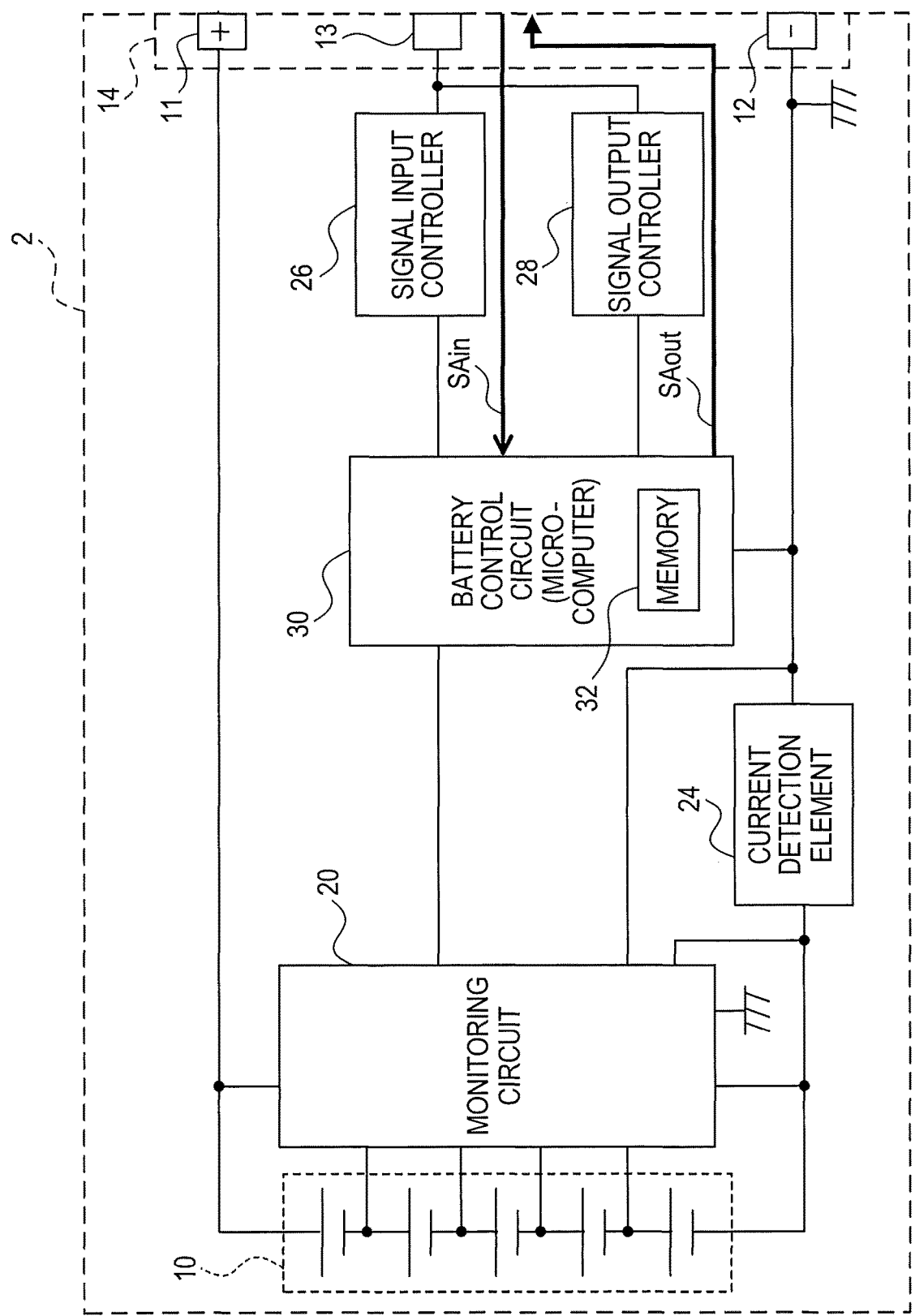
FIG. 2 is a block diagram showing a circuit configuration of the battery pack according to the first embodiment.

As shown in FIG. 2, the battery pack 2 includes a battery 10, the positive terminal 11, the negative terminal 12, the signal terminal 13, the apparatus connector 14, a monitoring circuit 20, a current detection element 24, a signal input controller 26, a signal output controller 28, and a battery control circuit 30.

The battery 10 is a rechargeable battery including rechargeable cells connected in series. The positive electrode of the battery 10 is connected to the positive terminal 11, while the negative electrode of the battery 10 is connected to the negative terminal 12.

The apparatus connector 14 is configured such that an electric apparatus (such as the electric working machine 100 and the power source controller 200), which is a receiver of the electric power supplied from the battery 10, can be detachably coupled. Moreover, the apparatus connector 14 is configured such that a charger (not shown), which is the power source for charging the battery 10, can be detachably coupled.

The signal terminal 13 is for transmitting and receiving various signals between the battery pack 2 and an apparatus connected to the battery pack 2. Examples of the various signals include a discharge permission signal SAout, a power supply command signal SBin, and a dummy command signal SAin.

The discharge permission signal SAout is outputted by the battery pack 2 through the signal terminal 13 when the battery pack 2 is in a dischargeable state. The battery pack 2 outputs the discharge permission signal SAout upon receipt of the power supply command signal SBin or the dummy command signal SAin, if the battery pack 2 is in the dischargeable state.

The power supply command signal SBin is outputted by the electric working machine 100 through the signal terminal 103 when the electric working machine 100 needs an electric power. The dummy command signal SAin is outputted by the power source controller 200 imitating the power supply command signal SBin. The dummy command signal SAin is inputted from the power source controller 200 to the battery pack 2 when the battery pack 2 is coupled to the power source controller 200.

The current detection element 24 is disposed in a current conduction path between the negative electrode of the battery 10 and the negative terminal 12. The current detection element 24 may include a resistor.

The monitoring circuit 20 is an integrated circuit that monitors the voltage of the battery 10 (battery voltage) and voltage of each cell (cell voltage). The monitoring circuit 20 detects the voltage across the current detection element 24 so as to monitor a charging current, flowing when the battery 10 is charged, and a discharging current, flowing when the battery 10 is discharged. The monitoring circuit 20 detects the cell voltage of each cell of the battery 10 so as to monitor the battery voltage and each cell voltage. The monitoring circuit 20 transmits a monitoring result (for example, the battery voltage, the cell voltages, and the charging or discharging current) to the battery control circuit 30.

The battery control circuit 30 includes a microcomputer including a CPU, a ROM, and a RAM. The battery control circuit 30 includes a memory 32 where various information is stored. The memory 32 is a non-volatile memory.

The signal input controller 26 controls, in accordance with a command from the battery control circuit 30, various input signals inputted through the signal terminal 13. Examples of the signals inputted from the power source controller 200, in a case where the battery pack 2 is coupled to the power source controller 200, include the dummy command signal SAin. Examples of the signals inputted from the electric working machine 100, in a case where the battery pack 2 is coupled to the electric working machine 100, include the power supply command signal SBin.

The signal output controller 28 is configured to control, in accordance with the command from the battery control circuit 30, various output signals outputted through the signal terminal 13. Examples of the output signals include the discharge permission signal SAout.

Upon receipt of the dummy command signal SAin via the apparatus connector 14 (specifically, the signal terminal 13) and the signal input controller 26, the battery control circuit 30 determines whether the battery 10 is in the dischargeable state based on the monitoring result provided by the monitoring circuit 20. The battery control circuit 30 outputs the result of the determination whether the battery 10 is in the dischargeable state (to be also referred to as dischargeable/non-dischargeable determination result) via the apparatus connector 14 (specifically, the signal terminal 13) and the signal output controller 28. To be specific, the battery control circuit 30 outputs the discharge permission signal SAout if the battery 10 is in the dischargeable state, and does not output the discharge permission signal SAout if the battery 10 is in a non-dischargeable state. In other words, the battery control circuit 30 is configured to output the dischargeable/non-dischargeable determination result by changing the state of output of the discharge permission signal SAout to an output execution state or to an output stop state.

[1-3. Power Source Controller]

Figure 3:
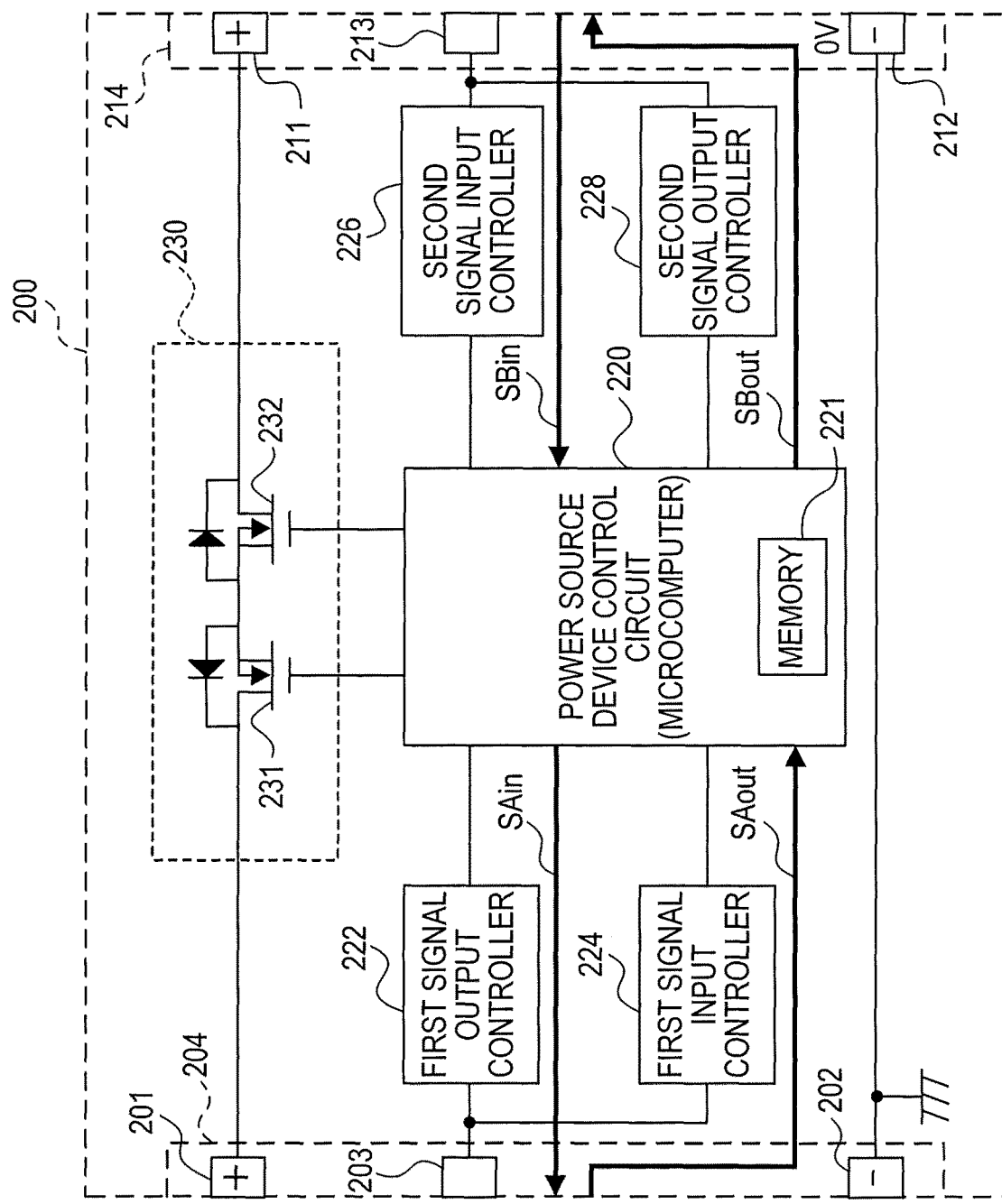
FIG. 3 is a block diagram showing a circuit configuration of a power source controller according to the first embodiment.

As shown in FIG. 3, the power source controller 200 includes a power source device control circuit 220, a first signal output controller 222, a first signal input controller 224, a second signal input controller 226, a second signal output controller 228, and a switch 230. Moreover, as described above, the power source controller 200 includes the first positive terminal 201, the first negative terminal 202, the first signal terminal 203, the battery pack connector 204, the second positive terminal 211, the second negative terminal 212, the second signal terminal 213, and the working machine connector 214.

The power source device control circuit 220 includes a microcomputer including a CPU, a ROM, and a RAM. The power source device control circuit 220 includes a memory 221 where various information is stored. The memory 221 is a non-volatile memory.

The power source device control circuit 220 performs various control processes so as to control each part of the power source controller 200. Among the various control processes, a battery pack state confirmation process will be described later.

The first signal output controller 222 controls various output signals to be outputted through the first signal terminal 203 in accordance with commands from the power source device control circuit 220. Examples of the output signals to the battery pack 2 include the dummy command signal SAin. The first signal input controller 224 controls various input signals inputted through the first signal terminal 203 in accordance with commands from the power source device control circuit 220. Examples of the input signals from the battery pack 2 include the discharge permission signal SAout.

The second signal input controller 226 controls various input signals inputted through the second signal terminal 213 in accordance with commands from the power source device control circuit 220. Examples of the input signals from the electric working machine 100 include the power supply command signal SBin. The second signal output controller 228 controls various output signals outputted through the second signal terminal 213 in accordance with commands from the power source device control circuit 220. Examples of the output signals to the electric working machine 100 include a dummy permission signal SBout.

The dummy permission signal SBout imitates the discharge permission signal SAout. The dummy permission signal SBout is outputted from the power source controller 200 to the electric working machine 100 while the discharge permission signal SAout is transmitted from the battery pack 2 to the power source controller 200.

The switch 230 is directly connected in series to a current conduction path connecting the first positive terminal 201 and the second positive terminal 211. The switch 230 is configured to change the electrical state of the inside of the switch 230 to a conducting state (an ON state) or to an interrupted state (OFF state) in accordance with a command from the power source device control circuit 220.

The switch 230 may include two field effect transistors (FETs) 231, 232 connected as shown in FIG. 3. The two FETs 231, 232 are connected in series so that the direction of current conduction between the drain and the source of the FET 231 and the direction of current conduction between the drain and the source of the FET 232 become opposite directions to each other, while voltage is applied to their gates. Due to its characteristics, an FET generally includes a parasitic diode connected in parallel between the drain and the source, and is configured such that the direction of electrical conduction can be reversed due to the parasitic diode, when voltage is not applied to the gate. In contrast, the FETs 231, 232 are connected as shown in FIG. 3 in the present embodiment, thus making it possible, by controlling the FETs 231, 232 to be both in the interrupted state, to stop the electric currents in both directions (discharging current and charging current) in the current conduction path connecting the first positive terminal 201 and the second positive terminal 211. The switch 230 shown in FIG. 3 is turned on when the FETs 231, 232 are both brought into the conducting state.

The switch 230 may include other switch/switches in place of or in addition to the FETs. For example, the switch 230 may include a switch (a mechanical switch, a semiconductor element switch, and so on) configured to change the electrical state of the inside of the switch 230 to the conducting state or to the interrupted state.

[1-4. Electric Working Machine]

Figure 4:
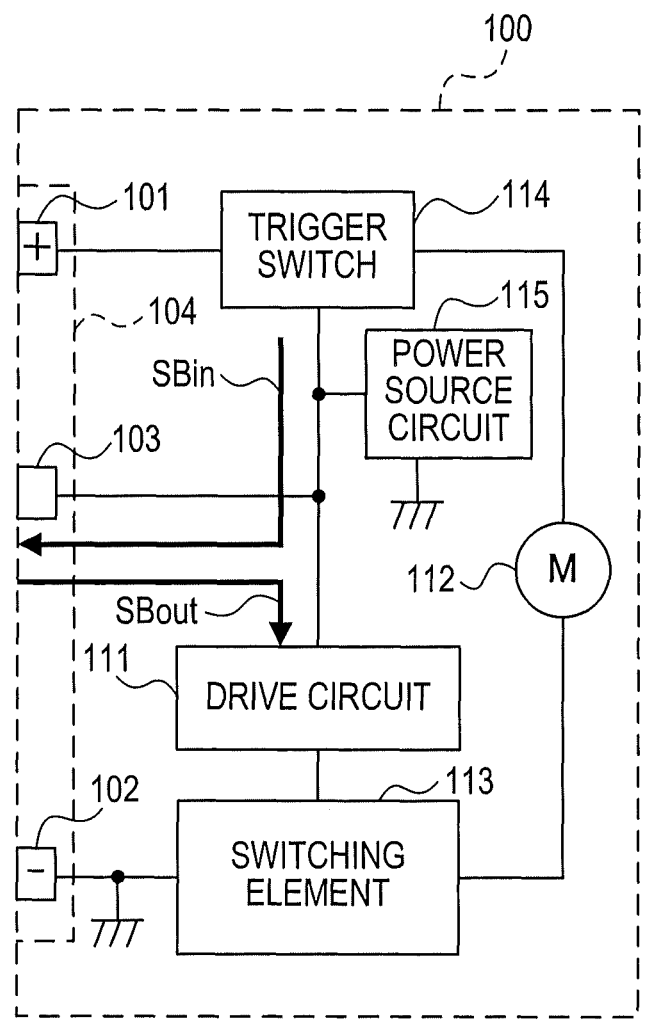
FIG. 4 is a block diagram showing a circuit configuration of the electric working machine according to the first embodiment.

As shown in FIG. 4, the electric working machine 100 includes a drive circuit 111, a motor 112, a switching element 113, a trigger switch 114, a power source circuit 115, the positive terminal 101, the negative terminal 102, the signal terminal 103, and the apparatus connector 104.

The positive terminal 101 is connected to a first terminal of the motor 112 via the trigger switch 114. The negative terminal 102 is connected to a second terminal of the motor 112 via the switching element 113. The motor 112 according to the present embodiment is a brushed direct-current motor.

The trigger switch 114 is turned on and off in response to user's manipulation of a trigger (not shown) provided to the electric working machine 100. Specifically, the trigger switch 114 is turned on when a user pulls the trigger, and turned off when the user releases the trigger. On/off information of the trigger switch 114 is inputted to the drive circuit 111.

The drive circuit 111 includes a microcomputer including a CPU and a memory (not shown). The drive circuit 111 achieves various functions by the CPU executing various programs stored in the memory. When the trigger switch 114 is turned on, the drive circuit 111 turns on the switching element 113 and energizes the motor 112 by the electric power supplied from the battery pack 2 so as to drive the motor 112. At this time, the electric power provided from the battery pack 2 is supplied to the electric working machine 100 via the power source controller 200. When the trigger switch 114 is turned off, the drive circuit 111 turns off the switching element 113 so as to stop the energization of the motor 112 by the battery pack 2.

When the trigger switch 114 is turned on, the drive circuit 111 outputs the power supply command signal SBin through the signal terminal 103. In other words, when the trigger switch 114 is manipulated and when the electric working machine 100 needs an electric power to drive the motor 112, the electric working machine 100 outputs the power supply command signal SBin through the signal terminal 103. If the electric working machine 100 is coupled to the power source controller 200, the power supply command signal SBin is inputted to the power source controller 200. If the electric working machine 100 is coupled to the battery pack 2, the power supply command signal SBin is inputted to the battery pack 2.

If a faulty state signal is inputted to the drive circuit 111 through the signal terminal 103, while the motor 112 is energized by the battery pack 2, the drive circuit 111 forcibly stops energizing the motor 112. Examples of the faulty state signal include a signal for notification of a faulty state of the battery pack 2, and a signal for notification of a faulty state of the power source controller 200.

The power source circuit 115 includes a regulator that generates constant voltage at a prescribed voltage value. The power source circuit 115 transforms the voltage supplied from the battery pack 2 via the power source controller 200 so as to generate internal supply voltage. The internal supply voltage is supplied to each part of the electric working machine 100. For example, the drive circuit 111 is operated by the internal supply voltage.

[1-5. Control Process]

Figure 5:
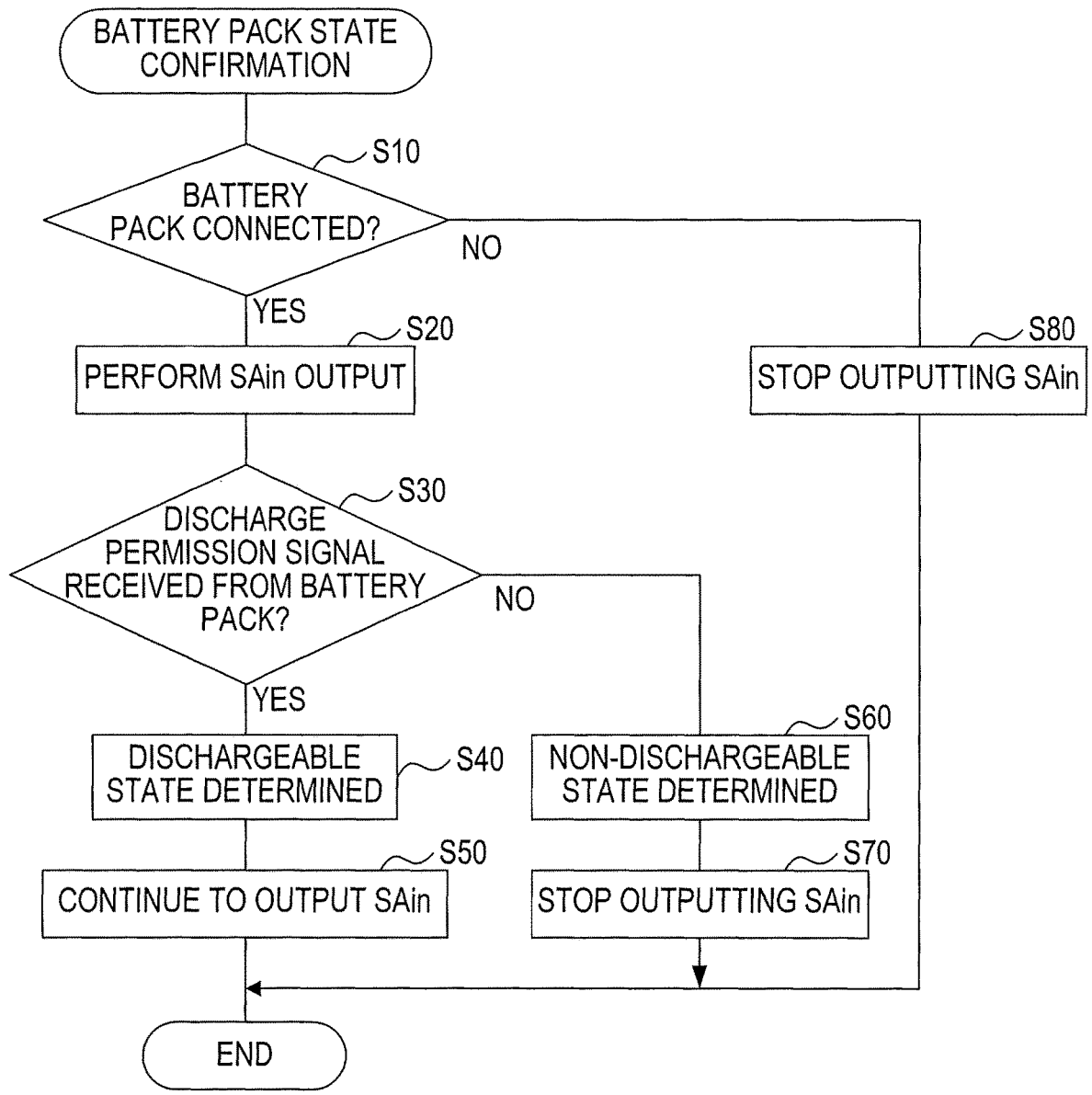
FIG. 5 is a flowchart illustrating details of a battery pack state confirmation process.

The battery pack state confirmation process performed by the power source controller 200 will be described with reference to FIG. 5.

The battery pack state confirmation process is one of the various control processes performed by the power source device control circuit 220. The battery pack state confirmation process is performed to confirm whether the battery pack 2 coupled to the power source controller 200 is in the dischargeable state.

The power source device control circuit 220 is operated by the electric power supplied from the battery pack 2, and is configured to repeat the battery pack state confirmation process.

When starting the battery pack state confirmation process, the power source device control circuit 220 first determines whether the battery pack 2 is coupled to the battery pack connector 204 in S10 (S denotes a step). If the power source device control circuit 220 makes an affirmative determination, the process proceeds to S20. If the power source device control circuit 220 makes a negative determination, the process proceeds to S80.

Upon the affirmative determination in S10, the process proceeds to S20, and the power source device control circuit 220 outputs the dummy command signal SAin to the battery pack 2. In the subsequent S30, the power source device control circuit 220 determines whether the discharge permission signal SAout has been inputted from the battery pack 2. If the power source device control circuit 220 makes an affirmative determination, the process proceeds to S40. If the power source device control circuit 220 makes a negative determination, the process proceeds to S60.

Upon the affirmative determination in S30, the process proceeds to S40, and the power source device control circuit 220 determines that the battery pack 2 is in the dischargeable state. In the subsequent S50, the power source device control circuit 220 continues to output the dummy command signal SAin to the battery pack 2.

Upon the negative determination in S30, the process proceeds to S60, and the power source device control circuit 220 determines that the battery pack 2 is in the non-dischargeable state. In the subsequent S70, the power source device control circuit 220 stops outputting the dummy command signal SAin to the battery pack 2.

Upon the negative determination in S10, the process proceeds to S80, and the power source device control circuit 220 stops outputting the dummy command signal SAin to the battery pack 2.

When finishing the processing of any one of S50, S70, and S80, the power source device control circuit 220 terminates the battery pack state confirmation process.

The power source device control circuit 220 repeats the battery pack state confirmation process in a specified execution cycle.

The power source device control circuit 220 performs the dummy permission signal control process as one of the various control processes. Upon receipt of the power supply command signal SBin from the electric working machine 100, the power source device control circuit 220 performs the dummy permission signal control process.

When starting the dummy permission signal control process, the power source device control circuit 220 determines, based on the result of determination in the battery pack state confirmation process, whether the battery pack 2 is in the dischargeable state. If the battery pack 2 is in the dischargeable state, the power source device control circuit 220 outputs the dummy permission signal SBout to the electric working machine 100 through the second signal terminal 213. At this time, the power source device control circuit 220 also outputs a command signal to turn on the switch 230 to the switch 230. The ON state of the switch 230 enables the power source controller 200 to supply the electric power from the battery pack 2 to the electric working machine 100.

On the other hand, if the battery pack 2 is in the non-dischargeable state in the dummy permission signal control process, the power source device control circuit 220 stops outputting the dummy permission signal SBout. At this time, the power source device control circuit 220 also outputs a command signal to turn off the switch 230 to the switch 230. The OFF state of the switch 230 enables the power source controller 200 to stop the power supply from the battery pack 2 to the electric working machine 100.

As a result of the determination in the battery pack state confirmation process, if it is determined that the battery pack 2 is in the non-dischargeable state, the power source device control circuit 220 may stop outputting the dummy permission signal SBout and output the command signal to turn off the switch 230 to the switch 230 irrespective of whether the power supply command signal SBin has been received from the electric working machine 100.

In other words, the power source device control circuit 220 is configured to supply the electric power from the battery pack 2 to the electric working machine 100, if the battery pack 2 (specifically, the battery 10) is in the dischargeable state and the power source device control circuit 220 has received the power supply command signal SBin from the electric working machine 100.

Moreover, upon coupling of the battery pack 2 to the battery pack connector 204, the power source device control circuit 220 transmits the dummy command signal SAin, which imitates the power supply command signal SBin, to the battery control circuit 30 of the battery pack 2.

[1-6. Effects]

As described above, the power source controller 200 provided to the power supply device 3 of the job-site electric system 1 according to the present embodiment can acquire the result of determination whether the battery pack 2 is in the dischargeable state before receiving the power supply command signal SBin from the electric working machine 100. Thus, upon receipt of the power supply command signal SBin from the electric working machine 100, the power source controller 200 can output the state of the battery pack 2 (whether it is in the dischargeable state) to the electric working machine 100 without performing the inquiry process with respect to the battery pack 2.

That is, after receiving the power supply command signal SBin, the power source controller 200 does not need the time for performing the inquiry process with respect to the battery pack 2, which in turn shortens the length of time from when the power supply command signal SBin is received and until when the state of the battery pack 2 is outputted to the electric working machine 100.

Thus, the power source controller 200 can inhibit a decrease of responsiveness of the electric working machine 100 and a decrease of operability of the electric working machine 100 to its users, even if the power source controller 200 is disposed between the battery pack 2 and the electric working machine 100.

The condition under which the dummy command signal SAin is outputted according to the present disclosure is "when the battery pack 2 is coupled to the battery pack connector 204", which includes both "when the electric working machine 100 is coupled to the working machine connector 214" and "when the electric working machine 100 is not coupled to the working machine connector 214".

The power source device control circuit 220 is configured to continue to transmit the dummy command signal SAin (S20 and S50) in response to coupling of the battery pack 2 to the battery pack connector 204 (the affirmative determination in S10).

Accordingly, even when the state of the battery pack 2 (specifically, the battery 10) changes, the power source device control circuit 220 can acquire the result of determination corresponding to the state of the battery pack 2 after the change by continuing to transmit the dummy command signal SAin. For example, even if the battery pack 2 is in the dischargeable state immediately after being coupled to the battery pack connector 204, the state of the battery pack 2 may change to the non-dischargeable state due to some factor(s) such as the subsequent power consumption and the temperature condition. Even in this case, the continuation of transmission of the dummy command signal SAin by the power source device control circuit 220 enables the power source controller 200 to acquire the result of determination corresponding to the latest state of the battery pack 2.

The power source device control circuit 220 is configured to stop transmitting (outputting) the dummy command signal SAin (S70) in response to a change in state of the battery pack 2 from the dischargeable state to the non-dischargeable state (the negative determination in S30).

That is, it is not so much necessary to inquire the state of the battery pack 2 immediately after the state of the battery pack 2 (specifically, the battery 10) changes. Thus, the power source controller 200 can reduce the processing load of the power source device control circuit 220 by stopping the transmission of the dummy command signal SAin.

The power source device control circuit 220 repeats the battery pack state confirmation process in the specified execution cycle. In other words, the power source device control circuit 220 is configured to, after stopping the transmission of the dummy command signal SAin (S70), resume the transmission (output) of the dummy command signal SAin in response to an elapse of a specified waiting time (execution cycle) (S20).

After changing to the non-dischargeable state, the state of the battery pack 2 may change to the dischargeable state as time passes. Thus, the power source controller 200 can check whether the state of the battery pack 2 has been changed back to the dischargeable state by transmitting the dummy command signal SAin again after the elapse of the waiting time (execution cycle).

The power supply device 3 includes the power source controller 200 that achieves the above-described effects. The power supply device 3 thus achieves the same effects as those achieved by the power source controller 200. In other words, the power supply device 3 including the power source controller 200 can still inhibit the decrease of responsiveness of the electric working machine 100 and the decrease of operability of the electric working machine 100 to its users.

The job-site electric system 1 includes the power supply device 3 that achieves the above-described effects. The job-site electric system 1 thus achieves the same effects as those achieved by the power source controller 200. In other words, the job-site electric system 1 can still inhibit the decrease of responsiveness of the electric working machine 100 in a case where the power supply device 3 includes the power source controller 200. Accordingly, in a case where the power source controller 200 with additional functionality is used, the job-site electric system 1 can still inhibit the decrease of responsiveness of the electric working machine 100 and the decrease of operability of the electric working machine 100 to its users.

[1-7. Corresponding Relations of Terms]

The following explains the corresponding relations of the terms in the present embodiment.

The battery pack 2 corresponds to one example of the first battery pack of the present disclosure. The battery 10 corresponds to one example of the rechargeable battery of the present disclosure. The battery pack connector 204 corresponds to one example of the first battery pack connector of the present disclosure. The power source device control circuit 220 corresponds to one example of the power supply control device of the present disclosure.

2. Second Embodiment

[2-1. Overall Configuration]

Figure 6:
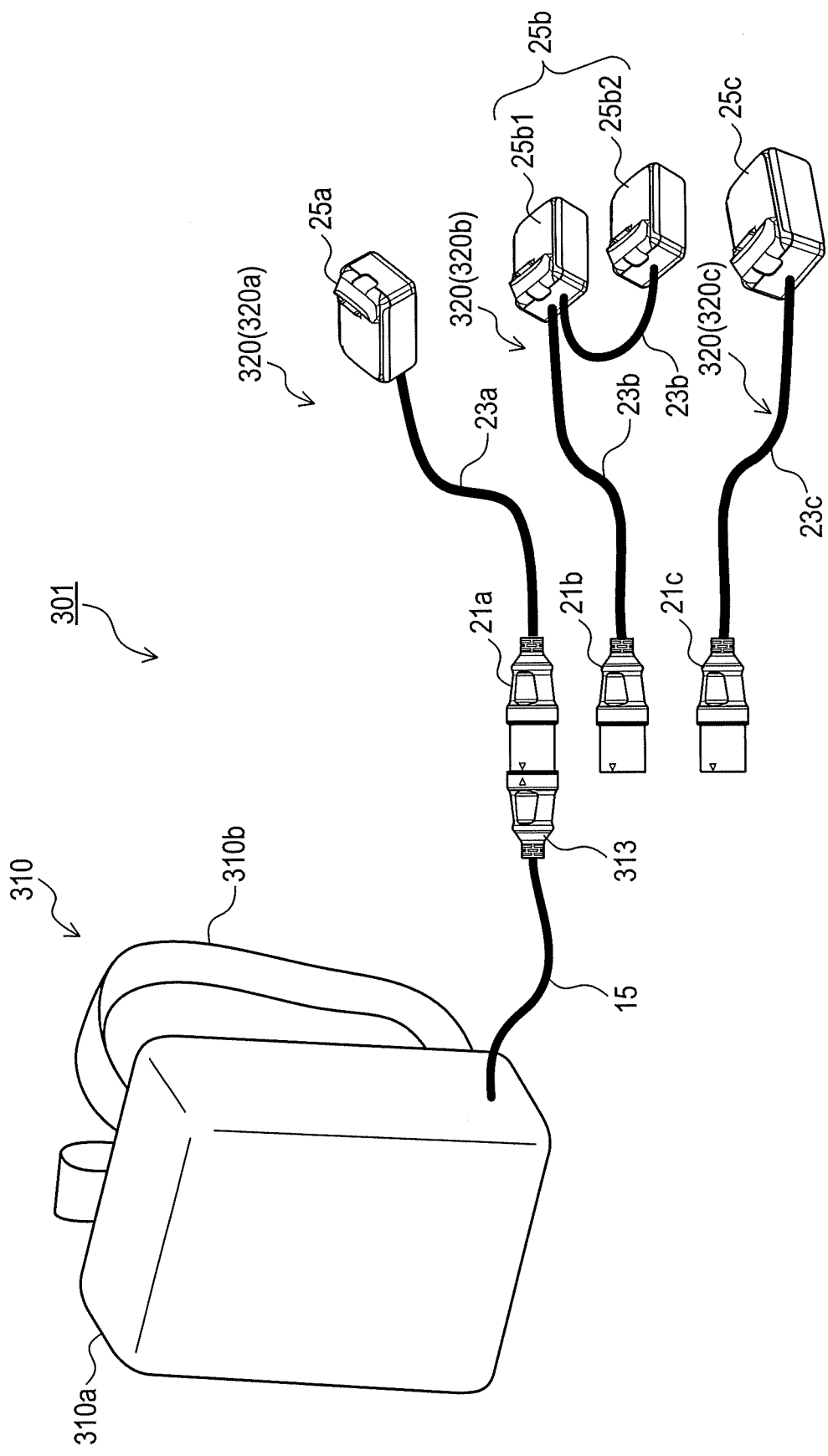
FIG. 6 is an explanatory diagram showing an overall configuration of an electric power supply system according to a second embodiment.

As shown in FIG. 6, an electric power supply system 301 according to a second embodiment includes a power supply device 310 and a discharge adapter 320. The electric power supply system 301 is configured to supply an electric power accumulated in the power supply device 310 to an electric apparatus coupled to the discharge adapter 320.

Examples of the electric apparatus include an electric power tool, an electric cleaner, and an electric gardening apparatus. These electric apparatuses include an apparatus driven by, for example, one 18 V battery pack coupled thereto, an apparatus driven by two 18 V battery packs coupled thereto, and an apparatus driven by one 36 V battery pack coupled thereto.

The power supply device 310 includes a battery accommodating body 310a, shoulder straps 310b, an output connector 313, and an output extension cable 15.

The battery accommodating body 310a is configured to accommodate battery packs therein. The battery packs are not shown in FIG. 6 since they are stored inside the battery accommodating body 310a. In the second embodiment, the battery accommodating body 310a includes eight battery packs 33c1-33c4, 35c1-35c4 (see FIG. 7) as described below. The battery packs according to the second embodiment have rated output voltages of 18 V.

The eight battery packs 33c1-33c4, 35c1-35c4 each include the same components as those of the battery pack 2 of the first embodiment (the battery 10, the positive terminal 11, the negative terminal 12, the signal terminal 13, the apparatus connector 14, the monitoring circuit 20, the current detection element 24, the signal input controller 26, the signal output controller 28, the battery control circuit 30, and so on). Accordingly, detailed description of the battery packs 33c1-33c4, 35c1-35c4 is not repeated here.

The shoulder straps 310b are fixed to the battery accommodating body 310a so that the user can carry the battery accommodating body 310a on the user's back. The output connector 313 is connected to the battery accommodating body 310a via the output extension cable 15. The output connector 313 is configured to be connected to any one of connectors of the discharge adapter 320 (specifically, any one of a first-voltage output connector 21a, a multi-output connector 21b, a second-voltage output connector 21c which will be described below).

The discharge adapter 320 includes a first voltage adapter 320a, a multi-output adapter 320b, and a second voltage adapter 320c. The electric power supply system 301 is configured such that power supply to the electric apparatus using the power supply device 310 is enabled by connecting the discharge adapter 320 to the electric apparatus, instead of connecting battery packs.

The first voltage adapter 320a includes one 18 V output system, and outputs the voltage of 18 V of the one system to the electric apparatus. The first voltage adapter 320a includes the first-voltage output connector 21a, an apparatus connection cable 23a, and an apparatus side device 25a.

The multi-output adapter 320b includes two 18 V output systems, and outputs the voltages of 18 V of the two systems to the electric apparatuses. The multi-output adapter 320b includes the multi-output connector 21b, an apparatus connection cable 23b, and an apparatus side device 25b. The apparatus side device 25b includes a first-apparatus side device 25b1 and a second-apparatus side device 25b2.

The second voltage adapter 320c includes one 36 V output system, and outputs the voltage of 36 V of the one system to the electric apparatus. The second voltage adapter 320c includes the second-voltage output connector 21c, an apparatus connection cable 23c, and an apparatus side device 25c.

The apparatus side devices 25a, 25b, 25c are each configured to be detachably coupled to the electric apparatus.

[2-2. Power Supply Device]

As described above, the power supply device 310 includes the battery accommodating body 310a, the output connector 313, and the output extension cable 15.

Figure 7:
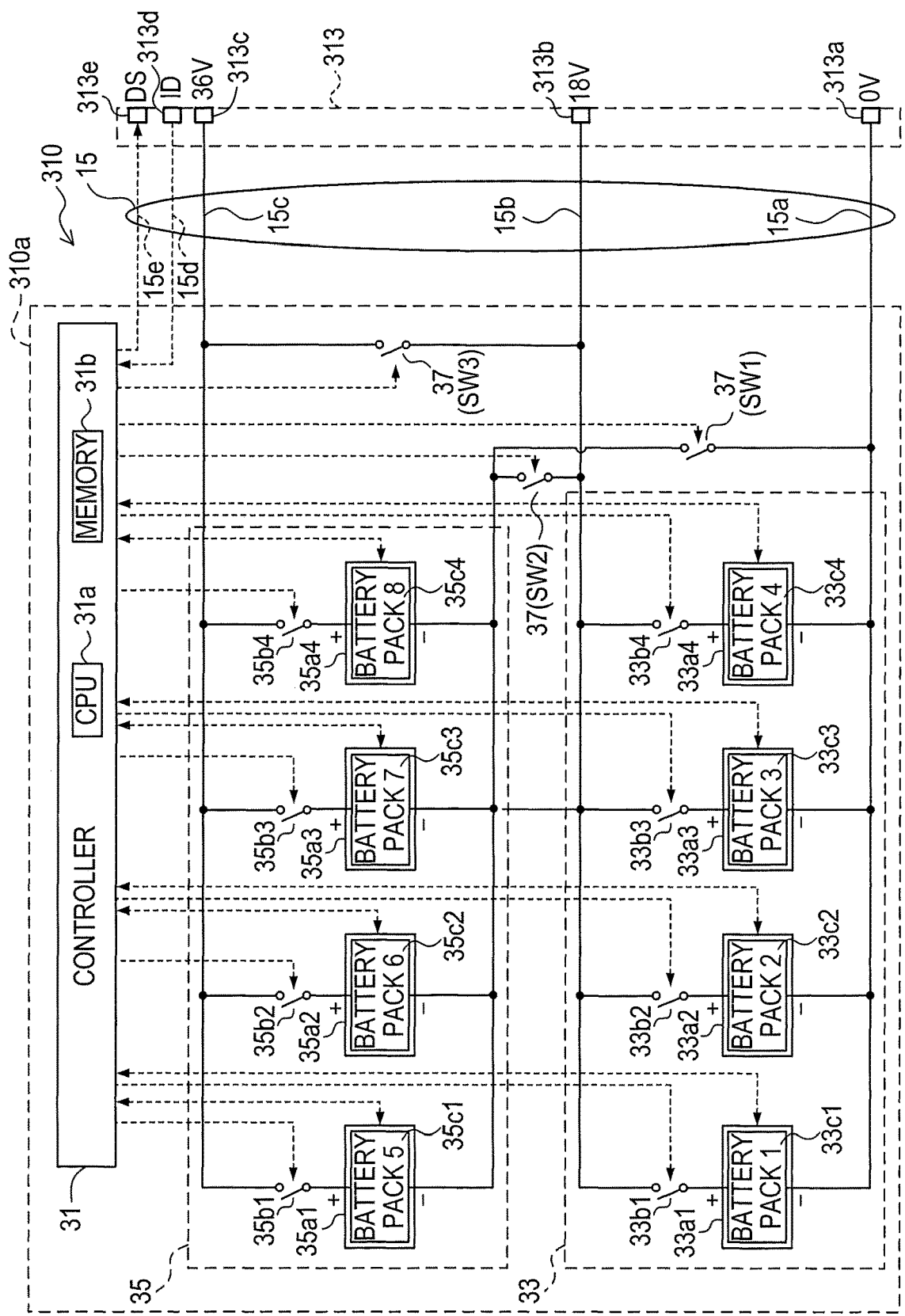
FIG. 7 is an explanatory diagram showing an electrical configuration of a power supply device.

As shown in FIG. 7, the output connector 313 includes a ground output terminal 313a, a first positive output terminal 313b, a second positive output terminal 313c, an identifier acquisition terminal 313d, and a permission signal output terminal 313e.

The ground output terminal 313a is a terminal at which the electric potential of output voltage is a reference potential (=0 V). The first positive output terminal 313b is used to output 18 V of a single system or 18 V of two or more systems. The second positive output terminal 313c is used to output 36 V of a single system, or to output 18 V of two or more systems. The identifier acquisition terminal 313d is provided for externally acquiring identifier information ID. The permission signal output terminal 313e is provided for externally outputting the discharge permission signal SAout.

The output extension cable 15 electrically couples the output connector 313 and the battery accommodating body 310a. The output extension cable 15 includes core wires 15a, 15b, 15c for voltage-output use and core wires 15d, 15e for signal use. The core wires 15a, 15b, 15c for voltage output use are respectively connected to the ground output terminal 313a, the first positive output terminal 313b, and the second positive output terminal 313c. The core wires 15d, 15e for signal use are respectively connected to the identifier acquisition terminal 313d and the permission signal output terminal 313e.

As shown in FIG. 7, the battery accommodating body 310a includes a controller 31, a first parallel-connected pack portion 33, a second parallel-connected pack portion 35, and an output voltage switch 37.

The controller 31 performs various control processes in the battery accommodating body 310a. The controller 31 performs, for example, an output voltage control process to control the voltage outputted from the output connector 313 and a faulty state detection process to detect the faulty state of each part of the battery accommodating body 310a. The controller 31 includes a CPU 31a (arithmetic device 31a), and a memory 31b (storage device 31b). The functions of the controller 31 are achieved by the CPU 31a executing various programs stored in the memory 31b.

The first parallel-connected pack portion 33 includes battery pack connectors 33a1-33a4 and individual switches 33b1-33b4. In the present embodiment, the first parallel-connected pack portion 33 includes four battery pack connectors 33a1-33a4 and four individual switches 33b1-33b4.

The battery pack connectors 33a1-33a4 are configured such that battery packs 33c1-33c4 are respectively removably connected thereto. Thus, when the output voltage of one of the battery packs 33c1-33c4 decreases (in other words, when the remaining power becomes low), it is possible in the battery accommodating body 310a to replace the corresponding battery pack. The battery packs 33c1-33c4 each have a positive terminal (+) and a negative terminal (−).

The individual switches 33b1-33b4 are respectively connected in series to the battery pack connectors 33a1-33a4. The individual switches 33b1-33b4 are configured such that the state of each of the individual switches 33b1-33b4 can be changed to a conducting state (ON state) or an interrupted state (OFF state) based on a control signal from the controller 31.

The first parallel-connected pack portion 33 is configured such that the battery pack connectors 33a1-33a4 are connected in parallel, thus enabling the battery packs 33c1-33c4, respectively coupled to the battery pack connectors 33a1-33a4, to be connected in parallel.

The first parallel-connected pack portion 33 described above is configured to, when at least one of the individual switches 33b1-33b4 is turned on based on the control signal from the controller 31, output voltage using the battery pack/packs 33c1-33c4 coupled to the battery pack connectors 33a1-33a4 corresponding to the at least one of the individual switches 33b1-33b4 in the ON state.

The individual switches 33b1-33b4 each may include a switch (such as a mechanical switch and a semiconductor element switch) configured to be changed to the conducting state (ON state) or to the interrupted state (OFF state). For example, the individual switches 33b1-33b4 each may include two field-effect transistors (FETs) similarly to the switch 230 of the first embodiment.

The second parallel-connected pack portion 35 includes battery pack connectors 35a1-35a4 and individual switches 35b1-35b4. In the present embodiment, the second parallel-connected pack portion 35 includes four battery pack connectors 35a1-35a4 and four individual switches 35b1-35b4. The battery pack connectors 35a1-35a4 are configured such that battery packs 35c1-35c4 are respectively removably connected thereto.

As shown in FIG. 7, the second parallel-connected pack portion 35 is configured in the same manner as the first parallel-connected pack portion 33, and thus detailed description thereof is not repeated. The battery pack connectors 35a1-35a4 correspond to the battery pack connectors 33a1-33a4. The individual switches 35b1-35b4 correspond to the individual switches 33b1-33b4. The battery packs 35c1-35c4 correspond to the battery packs 33c1-33c4.

The output voltage switch 37 includes a first switch SW1, a second switch SW2, and a third switch SW3. The output voltage switch 37 is configured to change the state of the electrical connection between the second parallel-connected pack portion 35 and the output connector 313 (specifically, the ground output terminal 313a, the first positive output terminal 313b, and the second positive output terminal 313c).

In the output connector 313, the ground output terminal 313a is directly coupled to the first parallel-connected pack portion 33 and is coupled to the second parallel-connected pack portion 35 via the output voltage switch 37 (specifically, the first switch SW1). The first positive output terminal 313b is directly coupled to the first parallel-connected pack portion 33 and is coupled to the second parallel-connected pack portion 35 via the output voltage switch 37 (specifically, the second switch SW2 and the third switch SW3). The second positive output terminal 313c is directly coupled to the second parallel-connected pack portion 35.

With regard to the connection to the first parallel-connected pack portion 33, the ground output terminal 313a is electrically coupled to the negative terminals (−) of the battery packs 33c1-33c4 via the battery pack connectors 33a1-33a4. With regard to the connection to the second parallel-connected pack portion 35, the ground output terminal 313a is electrically coupled to the negative terminals (−) of the battery packs 35c1-35c4 via the output voltage switch 37 (specifically, the first switch SW1) and via the battery pack connectors 35a1-35a4.

With regard to the connection to the first parallel-connected pack portion 33, the first positive output terminal 313b is configured to be electrically coupled to the positive terminals (+) of the battery packs 33c1-33c4 via the individual switches 33b1-33b4 and the battery pack connectors 33a1-33a4. With regard to the connection to the second parallel-connected pack portion 35, the first positive output terminal 313b is configured to be electrically coupled to the negative terminals (−) of the battery packs 35c1-35c4 via the output voltage switch 37 (specifically, the second switch SW2) and via the battery pack connectors 35a1-35a4. Moreover, with regard to the connection to the second parallel-connected pack portion 35, the first positive output terminal 313b is configured to be electrically coupled to the positive terminals (+) of the battery packs 35c1-35c4 via the output voltage switch 37 (specifically, the third switch SW3) and via the individual switches 35b1-35b4 and the battery pack connectors 35a1-35a4.

With regard to the connection to the second parallel-connected pack portion 35, the second positive output terminal 313c is configured to be electrically coupled to the positive terminals (+) of the battery packs 35c1-35c4 via the individual switches 35b1-35b4 and the battery pack connectors 35a1-35a4.

In other words, the output voltage switch 37 is configured to change the connection state of the positive terminals of the battery packs 35c1-35c4 connected in the second parallel-connected pack portion 35 to either one of the following state: a first connection state in which the positive terminals of the battery packs 35c1-35c4 are connected only to the second positive output terminal 313c; and a second connection state in which the positive terminals of the battery packs 35c1-35c4 are connected at least to the first positive output terminal 313b. The output voltage switch 37 of the present embodiment is configured to achieve a state in which the positive terminals of the battery packs 35c1-35c4 are connected to the first positive output terminal 313b and the second positive output terminal 313c as the second connection state. Moreover, the output voltage switch 37 is configured to change the connection state of the negative terminals of the battery packs 35c1-35c4 connected in the second parallel-connected pack portion 35 to either one of the following state: a state in which the negative terminals of the battery packs 35c1-35c4 are connected to the first positive output terminal 313b; and a state in which the negative terminals of the battery packs 35c1-35c4 are connected to the ground output terminal 313a.

Moreover, the first parallel-connected pack portion 33 is configured such that the positive terminals of the battery packs 33c1-33c4 are connected to the first positive output terminal 313b, and the negative terminals of the battery packs 33c1-33c4 are connected to the ground output terminal 313a.

[2-3. Discharge Adapter]

As described above, the discharge adapter 320 includes several types of discharge adapters that respectively output voltage to electric apparatuses in different state. The discharge adapter 320 of the present second embodiment includes the first voltage adapter 320a, the multi-output adapter 320b, and the second voltage adapter 320c.

The first voltage adapter 320a is configured to output the voltage of 18 V (the rated voltage of one battery pack) of one system to the electric apparatus. The multi-output adapter 320*b* is configured to output the voltages of 18 V (the rated voltage of one battery pack) of the two systems to the electric apparatus. The second voltage adapter 320*c* is configured to output the voltage of 36 V (voltage as twice as much as the rated voltage of one battery pack) of one system to the electric apparatus.

The configurations of the first voltage adapter 320*a*, the multi-output adapter 320*b*, and the second voltage adapter 320*c* will be each described.

[2-3-1. First Voltage Adapter]

Figure 8:
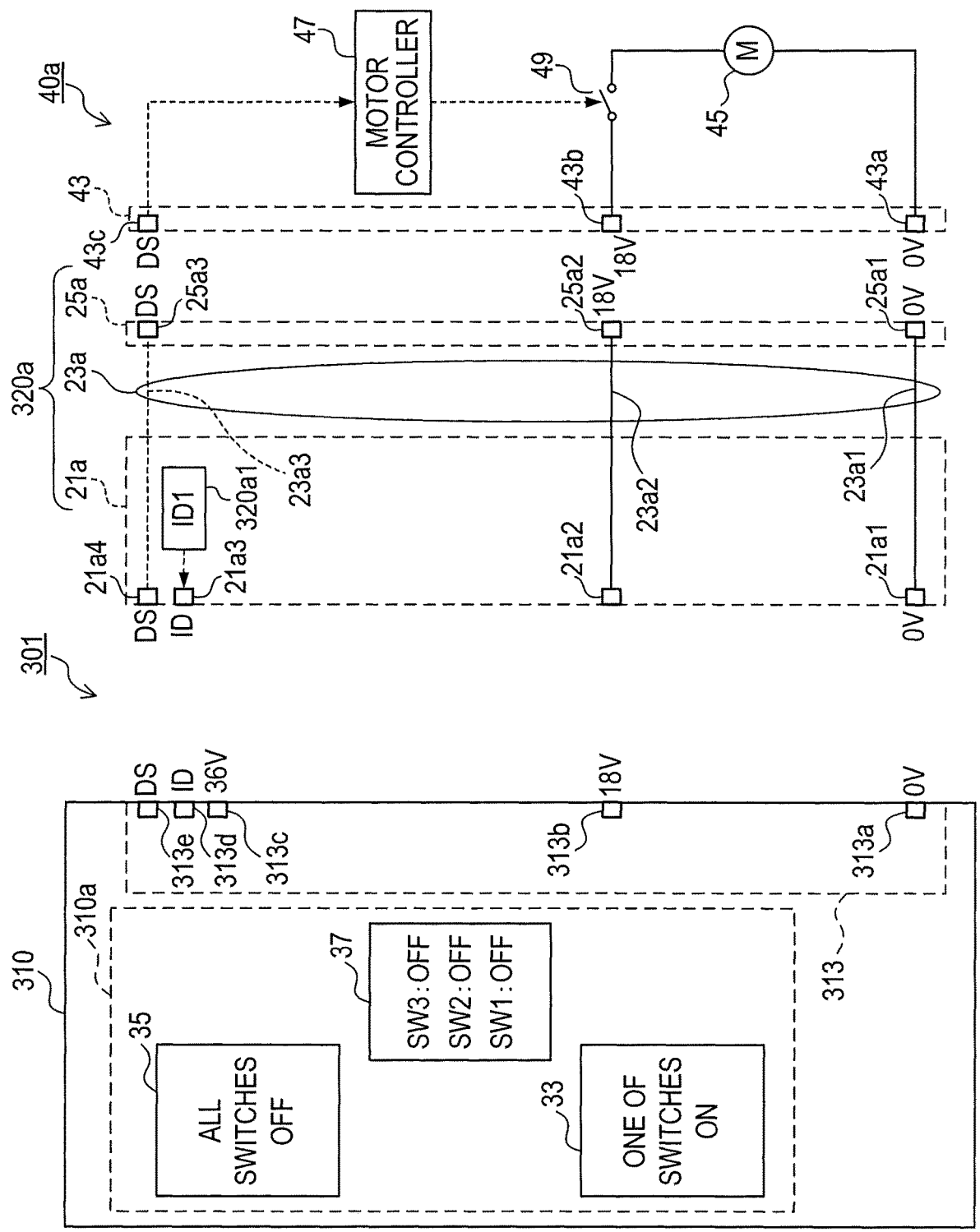
FIG. 8 is an explanatory diagram showing an electrical configurations of a voltage supplier, a first voltage adapter, and a first electric apparatus.

As shown in FIG. 8, the first voltage adapter 320*a* includes the first-voltage output connector 21*a*, the apparatus connection cable 23*a*, and the apparatus side device 25*a*.

The first-voltage output connector 21*a* includes a ground external terminal 21*a*1, a first external terminal 21*a*2, an identifier output terminal 21*a*3, and a permission signal acquisition terminal 21*a*4. The ground external terminal 21*a*1 is configured to be connected to the ground output terminal 313*a*. The first external terminal 21*a*2 is configured to be connected to the first positive output terminal 313*b*. The identifier output terminal 21*a*3 is configured to be connected to the identifier acquisition terminal 313*d*. The permission signal acquisition terminal 21*a*4 is configured to be connected to the permission signal output terminal 313*e*.

The first-voltage output connector 21*a* includes an information storage 320*a*1. The information storage 320*a*1 is configured to be connected to the identifier acquisition terminal 313*d* via the identifier output terminal 21*a*3. The information storage 320*a*1 stores identifier information of the first voltage adapter 320*a*. The identifier information indicates the state of voltage that is required to be outputted through the output connector 313. The information storage 320*a*1 stores first identifier information ID1 as the identifier information of the first voltage adapter 320*a*. The first identifier information ID1 indicates the state of voltage output for outputting the voltage of 18 V using the ground output terminal 313*a* and the first positive output terminal 313*b*.

The information storage 320*a*1 may include a fixed resistance element having an electric resistance value specified in advance in accordance with the identifier information. In this case, by detecting the electric resistance value of the information storage 320*a*1, the controller 31 can determine the state of voltage output suitable for the connected discharge adapter 320.

In response to acquisition of the first identifier information ID1 in the information storage 320*a*1 from the first-voltage output connector 21*a*, the controller 31 controls the state of the output voltage switch 37 based on the first identifier information ID1. As shown in FIG. 8, the controller 31 controls the state of the output voltage switch 37 so that, for example, all of the first switch SW1, the second switch SW2, and the third switch SW3 are turned off. At this time, the controller 31 also turns on the individual switch (one of the individual switches 33*b*1-33*b*4) corresponding to one of the battery packs 33*c*1-33*c*4 connected in the first parallel-connected pack portion 33 and having the highest output voltage, and turns off the individual switches corresponding to other battery packs. At this time, the controller 31 furthermore turns off all the individual switches 35*b*1-35*b*4 in the second parallel-connected pack portion 35.

Consequently, the power supply device 310 can output the voltage of 18 V through the output connector 313 using the battery packs 33*c*1-33*c*4 connected in the first parallel-connected pack portion 33. FIG. 8 only shows, with regard to the power supply device 310, the schematic configuration of the output connector 313 and the state of each switch in the battery accommodating body 310*a*, but does not show the configuration of other parts of the power supply device 310.

Moreover, when voltage output through the output connector 313 is possible, the controller 31 outputs the discharge permission signal SAout through the permission signal output terminal 313*e* to the permission signal acquisition terminal 21*a*4. When voltage output through the output connector 313 is not possible, the controller 31 stops externally outputting the discharge permission signal SAout through the permission signal output terminal 313*e*. The discharge permission signal SAout is a signal to notify the electric apparatus connected to the output connector 313 whether the power supply device 310 is in a state where voltage output is possible.

The apparatus connection cable 23*a* is configured to be electrically coupled to the first-voltage output connector 21*a*, and to be indirectly coupled to the first electric apparatus 40*a* through the apparatus side device 25*a*. The apparatus connection cable 23*a* includes a ground core wire 23*a*1 connected to the ground external terminal 21*a*1, a first voltage core wire 23*a*2 connected to the first external terminal 21*a*2, and a permission signal core wire 23*a*3 connected to the permission signal acquisition terminal 21*a*4.

The apparatus connection cable 23*a* is provided in a state in which core wires are bound by a single cover member.

The apparatus side device 25*a* is configured to be detachably coupled to a battery attachment portion 43 of the first electric apparatus 40*a*. The apparatus side device 25*a* includes a ground apparatus terminal 25*a*1, a first apparatus terminal 25*a*2, and a permission signal apparatus terminal 25*a*3.

The ground core wire 23*a*1 electrically connects the ground external terminal 21*a*1 of the first-voltage output connector 21*a* and the ground apparatus terminal 25*a*1 of the apparatus side device 25*a*. The first voltage core wire 23*a*2 electrically connects the first external terminal 21*a*2 of the first-voltage output connector 21*a* and the first apparatus terminal 25*a*2 of the apparatus side device 25*a*. The permission signal core wire 23*a*3 electrically connects the permission signal acquisition terminal 21*a*4 of the first-voltage output connector 21*a* and the permission signal apparatus terminal 25*a*3 of the apparatus side device 25*a*.

The first electric apparatus 40*a* is configured to be driven upon supply of the voltage of 18 V. The first electric apparatus 40*a* includes the battery attachment portion 43, a motor 45, a motor controller 47, and a drive switch 49.

The battery attachment portion 43 includes a ground terminal 43*a*, a first apparatus voltage terminal 43*b*, and a permission signal reception terminal 43*c*. The ground terminal 43*a* is configured to be connected to the ground apparatus terminal 25*a*1. The first apparatus voltage terminal 43*b* is configured to be connected to the first apparatus terminal 25*a*2. The permission signal reception terminal 43*c* is configured to be connected to the permission signal apparatus terminal 25*a*3. The battery attachment portion 43 is configured such that the battery pack 33*c*1 and the apparatus side device 25*a* are attached thereto.

The motor 45 is rotationally driven in response to application of voltage through the battery attachment portion 43 (specifically, the ground terminal 43*a* and the first apparatus voltage terminal 43*b*). The motor controller 47 controls the drive switch 49 to be in the ON state so as to energize the motor 45 in response to receipt of a drive command from the user (not shown, such as a drive command provided by means of trigger manipulation) while receiving the discharge permission signal SAout from the power supply device 310. The motor controller 47 controls the drive switch 49 to be in an OFF state so as to stop energizing the motor 45, if the motor controller 47 does not receive the drive command from the user while receiving the discharge permission signal SAout from the power supply device 310. The motor controller 47 controls the drive switch 49 to be in the OFF state so as to stop energizing the motor 45 if the motor control 47 does not receive the discharge permission signal SAout from the power supply device 310 regardless of receipt of the drive command from the user. In a case where the first voltage adapter 320a is connected, if all the battery packs 33c1-33c4 connected in the first parallel-connected pack portion 33 are in the non-dischargeable state, the power supply device 310 may control the output voltage switch 37 to output voltage using the battery packs 35c1-35c4 connected in the second parallel-connected pack portion 35.

Specifically, in response to acquiring of the identifier information of the information storage 320a1 from the first-voltage output connector 21a, the controller 31 controls the state of the output voltage switch 37 so that the first switch SW1 and the third switch SW3 are turned on, and the second switch SW2 is turned off. At this time, the controller 31 also turns on the individual switch (one of the individual switches 35b1-35b4) corresponding to one of the battery packs 35c1-35c4 connected in the second parallel-connected pack portion 35 having the highest output voltage and turns off the individual switches corresponding to other battery packs. At this time, the controller 31 furthermore turns off all the individual switches 33b1-33b4 in the first parallel-connected pack portion 33.

This enables the power supply device 310 to output the voltage of 18 V through the output connector 313 using the battery packs 35c1-35c4 connected in the second parallel-connected pack portion 35.

[2-3-2. Multi-Output Adapter]

Figure 9:
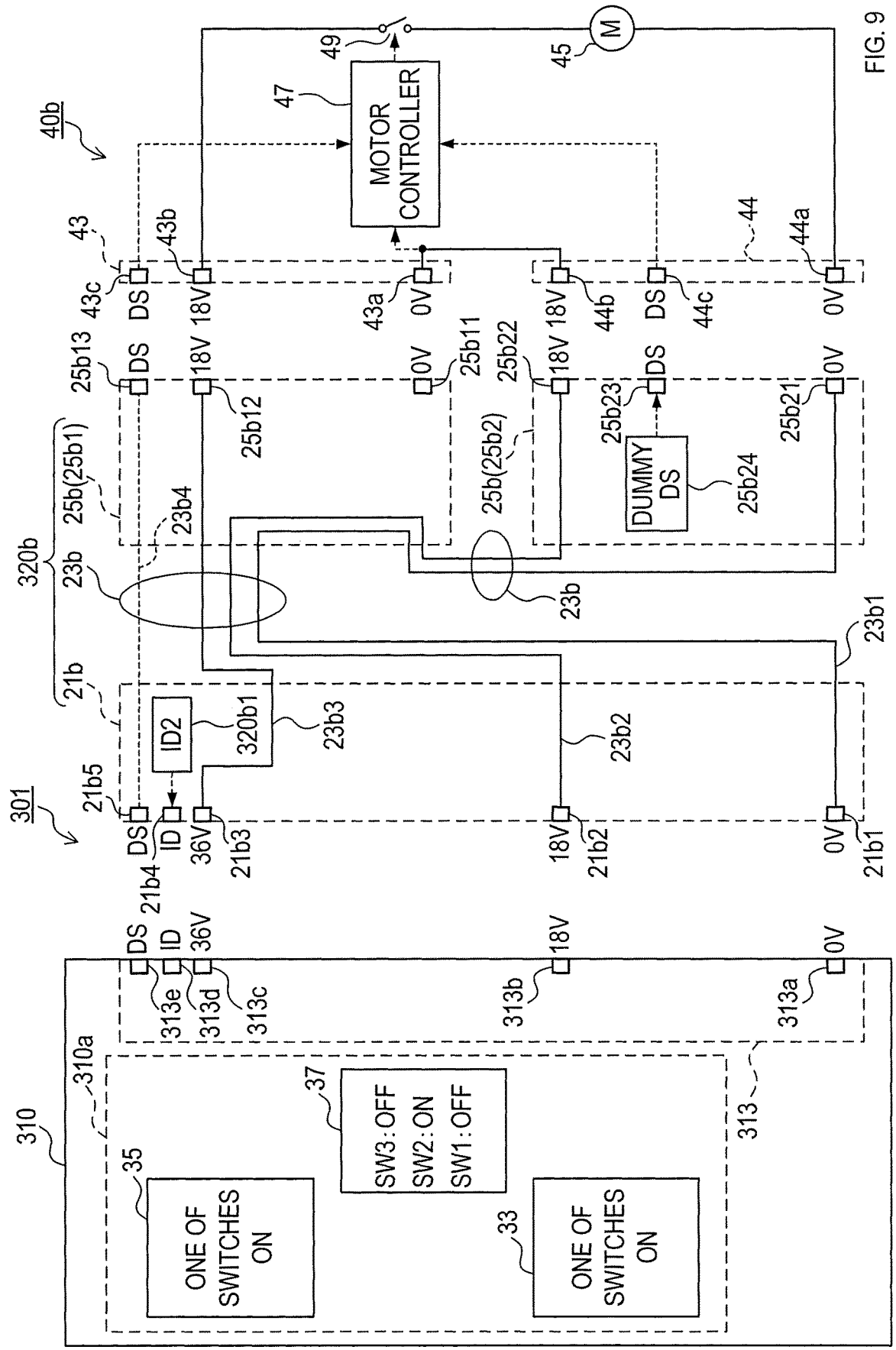
FIG. 9 is an explanatory diagram showing electrical configurations of the voltage supplier, a multi-output adapter, and a second electric apparatus.

As shown in FIG. 9, the multi-output adapter 320b includes the multi-output connector 21b, the apparatus connection cable 23b, and the apparatus side device 25b. The apparatus side device 25b includes the first-apparatus side device 25b1 and the second-apparatus side device 25b2.

The multi-output connector 21b includes a ground external terminal 21b1, a first external terminal 21b2, a second external terminal 21b3, an identifier output terminal 21b4, and a permission signal acquisition terminal 21b5. The ground external terminal 21b1 is configured to be connected to the ground output terminal 313a. The first external terminal 21b2 is configured to be connected to the first positive output terminal 313b. The second external terminal 21b3 is configured to be connected to the second positive output terminal 313c. The identifier output terminal 21b4 is configured to be connected to the identifier acquisition terminal 313d. The permission signal acquisition terminal 21b5 is configured to be connected to the permission signal output terminal 313e.

The multi-output connector 21b includes an information storage 320b1. The information storage 320b1 is configured to be connected to the identifier acquisition terminal 313d via the identifier output terminal 21b4.

The information storage 320b1 stores identifier information of the multi-output adapter 320b. The information storage 320b1 stores second identifier information ID2 as the identifier information of the multi-output adapter 320b. The second identifier information ID2 indicates the state of voltage output using the two 18 V output systems. Specifically, this state of voltage output includes outputting the voltage of 18 V using the ground output terminal 313a and the first positive output terminal 313b (a first system) and outputting the voltage of the 18 V using the first positive output terminal 313b and the second positive output terminal 313c (a second system).

The controller 31 acquires the second identifier information ID2 of the information storage 320b1 through the multi-output connector 21b, and then controls the state of the output voltage switch 37 based on the second identifier information ID2. The controller 31 controls the state of the output voltage switch 37 so that, for example, as shown in FIG. 9, the first switch SW1 and the third switch SW3 are turned off, while the second switch SW2 is turned on. At this time, the controller 31 also turns on the individual switch (one of the individual switches 33b1-33b4) corresponding to one of the battery packs 33c1-33c4 connected in the first parallel-connected pack portion 33 having the highest output voltage, and turns off the individual switches corresponding to other battery packs. At this time, the controller 31 similarly turns on one of the individual switches 35b1-35b4 corresponding to one of the battery packs 35c1-35c4 connected in the second parallel-connected pack portion 35 having the highest output voltage, and turns off the individual switches corresponding to other battery packs.

This enables the power supply device 310 to output the voltage of 18 V from the two systems through the output connector 313 using one of the battery packs 33c1-33c4 connected in the first parallel-connected pack portion 33 and one of the battery packs 35c1-35c4 connected in the second parallel-connected pack portion 35. FIG. 9 only shows, with regard to the power supply device 310, the schematic configuration of the output connector 313 and the state of each switch in the battery accommodating body 310a, but does not show the configuration of other parts of the power supply device 310.

The apparatus connection cable 23b is electrically coupled to the multi-output connector 21b and is configured to be indirectly coupled to the second electric apparatus 40b via the apparatus side device 25b (the first-apparatus side device 25b1 and the second-apparatus side device 25b2). The apparatus connection cable 23b is disposed between the multi-output connector 21b and the first-apparatus side device 25b1 and between the first-apparatus side device 25b1 and the second-apparatus side device 25b2. The apparatus connection cable 23b includes a ground core wire 23b1 connected to the ground external terminal 21b1, a first external-terminal core wire 23b2 connected to the first external terminal 21b2, a second external-terminal core wire 23b3 connected to the second external terminal 21b3, and permission signal core wire 23b4 coupled to the permission signal acquisition terminal 21b5.

The first-apparatus side device 25b1 and the second-apparatus side device 25b2 are configured to be respectively detachably attached to the first battery attachment portion 43 and the second battery attachment portion 44 of the second electric apparatus 40b. The first-apparatus side device 25b1 includes a ground apparatus terminal 25b11, a first apparatus terminal 25b12, and a permission signal apparatus terminal 25b13. The second-apparatus side device 25b2 includes a ground apparatus terminal 25b21, a first apparatus terminal 25b22, and a permission signal apparatus terminal 25b23.

The ground core wire 23b1 electrically connects the ground external terminal 21b1 of the multi-output connector 21b and the ground apparatus terminal 25b21 of the second-apparatus side device 25b2. The first external-terminal core wire 23b2 electrically connects the first external terminal 21*b*2 of the multi-output connector 21*b* and the first apparatus terminal 25*b*22 of the second-apparatus side device 25*b*2. The second external-terminal core wire 23*b*3 electrically connects the second external terminal 21*b*3 of the multi-output connector 21*b* and the first apparatus terminal 25*b*12 of the first-apparatus side device 25*b*1. The permission signal core wire 23*b*4 electrically connects the permission signal acquisition terminal 21*b*5 of the multi-output connector 21*b* and the permission signal apparatus terminal 25*b*13 of the first-apparatus side device 25*b*1.

The first external-terminal core wire 23*b*2 includes core wires thinner (having smaller diameters) than the ground core wire 23*b*1 and the second external-terminal core wire 23*b*3.

The ground core wire 23*b*1 and the first external-terminal core wire 23*b*2 are disposed so as to extend from the multi-output connector 21*b*, pass through the first-apparatus side device 25*b*1, and reach the second-apparatus side device 25*b*2. Moreover, the ground apparatus terminal 25*b*11 of the first-apparatus side device 25*b*1 is not connected to any core wire of the apparatus connection cable 23*b*. Furthermore, the second-apparatus side device 25*b*2 includes a dummy permission signal storage 25*b*24. The dummy permission signal storage 25*b*24 is coupled to the permission signal apparatus terminal 25*b*23, and outputs a second dummy permission signal DS to the second electric apparatus 40*b* so that the second electric apparatus 40*b* consistently receives the discharge permission signal through the permission signal apparatus terminal 25*b*23.

The second electric apparatus 40*b* is configured to be driven in response to supply of the voltages of 18 V from the two systems. The second electric apparatus 40*b* includes the first the battery attachment portion 43, the second battery attachment portion 44, the motor 45, the motor controller 47, and the drive switch 49.

The first battery attachment portion 43 includes the ground terminal 43*a*, the first apparatus voltage terminal 43*b*, and the permission signal reception terminal 43*c*. The ground terminal 43*a* is configured to be connected to the ground apparatus terminal 25*b*11. The first apparatus voltage terminal 43*b* is configured to be connected to the first apparatus terminal 25*b*12. The permission signal reception terminal 43*c* is configured to be connected to the permission signal apparatus terminal 25*b*13.

The second battery attachment portion 44 includes a ground terminal 44*a*, a first apparatus voltage terminal 44*b*, and a permission signal reception terminal 44*c*. The ground terminal 44*a* is configured to be connected to the ground apparatus terminal 25*b*21. The first apparatus voltage terminal 44*b* is configured to be connected to the first apparatus terminal 25*b*22. The permission signal reception terminal 44*c* is configured to be connected to the permission signal apparatus terminal 25*b*23.

The motor 45 is rotationally driven in response to application of voltage through the first battery attachment portion 43 (specifically, the first apparatus voltage terminal 43*b*) and the second battery attachment portion 44 (specifically, the ground terminal 44*a*). The motor controller 47 controls the drive switch 49 to be in the ON state so as to energize the motor 45 in response to receipt of a drive command (not shown) from the user while receiving the discharge permission signal SAout from the power supply device 310. The motor controller 47 controls the drive switch 49 to be in the OFF state so as to stop energizing the motor 45, if the motor controller 47 does not receive the drive command from the user while receiving the discharge permission signal SAout from the power supply device 310. The motor controller 47 controls the drive switch 49 to be in the OFF state so as to stop energizing the motor 45 if the motor controller 47 does not receive the discharge permission signal SAout from the power supply device 310 regardless of receipt of the drive command from the user.

[2-3-3. Second Voltage Adapter]

Figure 10:
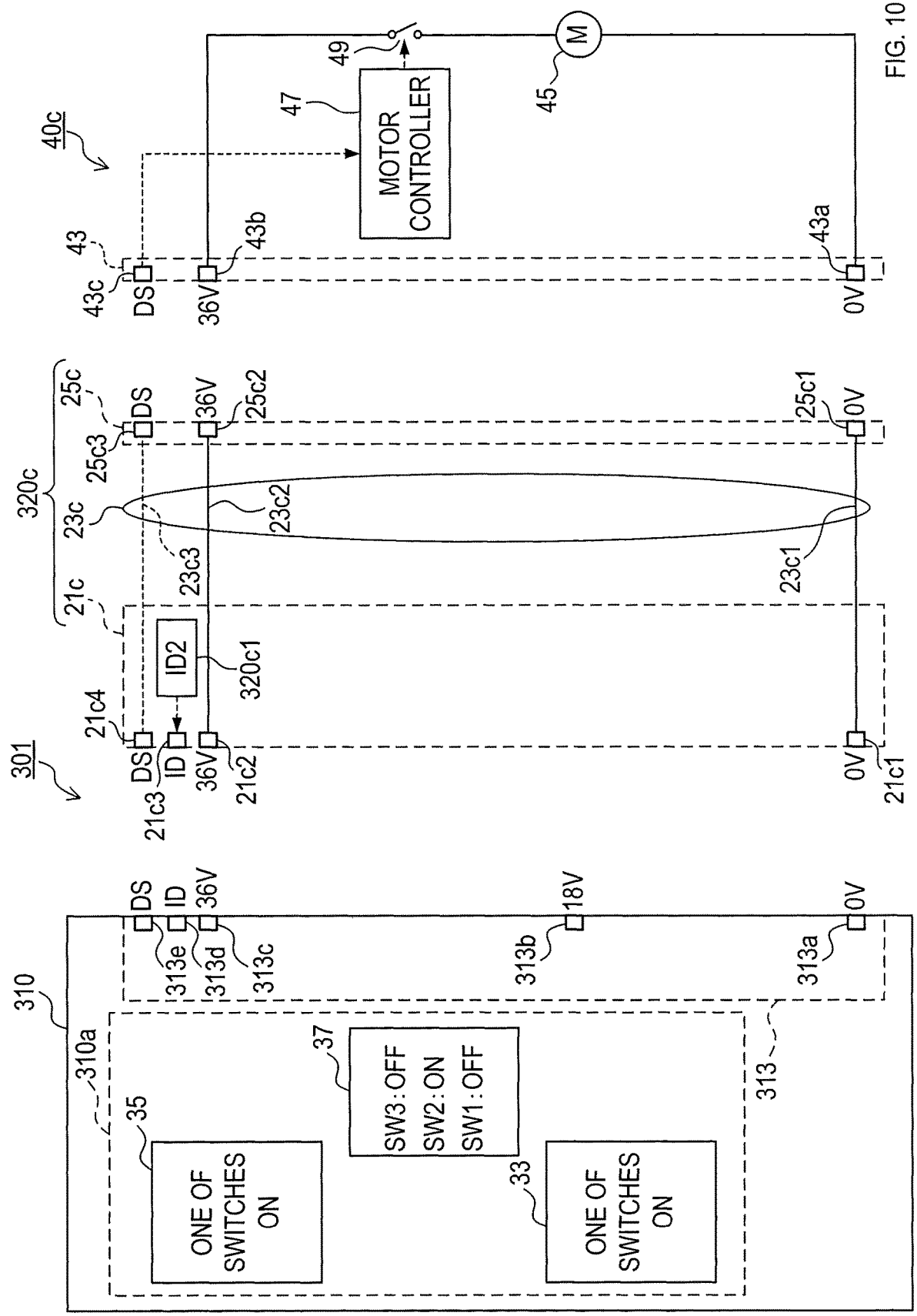
FIG. 10 is an explanatory diagram showing electrical configurations of the voltage supplier, a second voltage adapter, and a third electric apparatus.

As shown in FIG. 10, the second voltage adapter 320*c* includes the second-voltage output connector 21*c*, the apparatus connection cable 23*c*, and the apparatus side device 25*c*.

The second-voltage output connector 21*c* includes a ground external terminal 21*c*1, a second external terminal 21*c*2, an identifier output terminal 21*c*3, and a permission signal acquisition terminal 21*c*4. The ground external terminal 21*c*1 is configured to be connected to the ground output terminal 313*a*. The second external terminal 21*c*2 is configured to be connected to the second positive output terminal 313*c*. The identifier output terminal 21*c*3 is configured to be connected to the identifier acquisition terminal 313*d*. The permission signal acquisition terminal 21*c*4 is configured to be connected to the permission signal output terminal 313*e*.

The second-voltage output connector 21*c* includes an information storage 320*c*1. The information storage 320*c*1 is configured to be coupled to the identifier acquisition terminal 313*d* through the identifier output terminal 21*c*3. The information storage 320*c*1 stores identifier information of the second voltage adapter 320*c*. The information storage 320*c*1 stores the second identifier information ID2 as the identifier information of the second voltage adapter 320*c*. The second identifier information ID2 indicates the state of voltage output of the voltage of 36 V using the ground output terminal 313*a* and the second positive output terminal 313*c*.

In the present embodiment, the identifier information ID stored in the information storage 320*c*1 of the second-voltage output connector 21*c* and that stored in the information storage 320*b*1 of the multi-output connector 21*b* are the same, namely the second identifier information ID2. This is because when the electric power is received from the power supply device 310, the state of voltage output of the multi-output adapter 320*b* and that of the second voltage adapter 320*c* become the same. In a case where the state of voltage output of the multi-output adapter 320*b* and that of the second voltage adapter 320*c* are different to each other when the electric power is received from the power supply device 310, different identifier information may be stored in the respective information storages.

Upon acquisition of the second identifier information ID2 of the information storage 320*c*1 from the second-voltage output connector 21*c*, the controller 31 controls the state of the output voltage switch 37 based on the second identifier information ID2. The controller 31 controls the state of the output voltage switch 37, for example, as shown in FIG. 10, so that the first switch SW1 and the third switch SW3 are turned off, while the second switch SW2 is turned on. At this time, the controller 31 also turns on the individual switch (one of the individual switches 33*b*1-33*b*4) corresponding to one of the battery packs 33*c*1-33*c*4 connected in the first parallel-connected pack portion 33 having the highest output voltage, and turns off the individual switches corresponding to other battery packs. At this time, the controller 31 similarly turns on one of the individual switches 35*b*1-35*b*4 corresponding to one of the battery packs 35*c*1-35*c*4 connected in the second parallel-connected pack portion 35 having the highest output voltage, and turns off the individual switches corresponding to other battery packs.

This enables the power supply device 310 to output the voltage of 36 V from the output connector 313 using one of the battery packs 33c1-33c4 connected in the first parallel-connected pack portion 33 and one of the battery packs 35c1-35c4 connected in the second parallel-connected pack portion 35. FIG. 10 only shows, with regard to the power supply device 310, the schematic configuration of the output connector 313 and the state of each switch in the battery accommodating body 310a, but does not show the configuration of other parts of the power supply device 310.

The apparatus connection cable 23c is electrically coupled to the second-voltage output connector 21c and is configured to be indirectly coupled to the third electric apparatus 40c via the apparatus side device 25c. The apparatus connection cable 23c includes a ground core wire 23c1 connected to the ground external terminal 21c1, a second voltage core wire 23c2 connected to the second external terminal 21c2, and a permission signal core wire 23c3 connected to the permission signal acquisition terminal 21c4.

The apparatus side device 25c is configured to be detachably attached to the battery attachment portion 43 of the third electric apparatus 40c. The apparatus side device 25c includes a ground apparatus terminal 25c1, a second apparatus terminal 25c2, and a permission signal apparatus terminal 25c3.

The ground core wire 23c1 electrically connects the ground external terminal 21c1 of the second-voltage output connector 21c and the ground apparatus terminal 25c1 of the apparatus side device 25c. The second voltage core wire 23c2 electrically connects the second external terminal 21c2 of the second-voltage output connector 21c and the second apparatus terminal 25c2 of the apparatus side device 25c. The permission signal core wire 23c3 electrically connects the permission signal acquisition terminal 21c4 of the second-voltage output connector 21c and the permission signal apparatus terminal 25c3 of the apparatus side device 25c.

The third electric apparatus 40c is configured to be driven upon supply of the voltage of 36 V. The third electric apparatus 40c includes the battery attachment portion 43, the motor 45, the motor controller 47, and the drive switch 49.

The battery attachment portion 43, the motor 45, the motor controller 47, and the drive switch 49 of the third electric apparatus 40c are substantially the same as the battery attachment portion 43, the motor 45, the motor controller 47, and the drive switch 49 of the first electric apparatus 40a except for the driving voltage (not 18 V drive, but 36 V drive). Thus, the detailed description of the aforementioned components are not repeated.

[2-4. Output Voltage Control]

Among the various control processes performed by the power supply device 310, the output voltage control process will be described. The various control processes such as the output voltage control process are performed by the controller 31 among the components of the power supply device 310. The output voltage control process is intended for acquiring the identifier information ID from the discharge adapter 320 coupled to the output connector 313 so as to output voltage through the output connector 313 in the state of voltage output in accordance with the identifier information ID.

Figure 11:
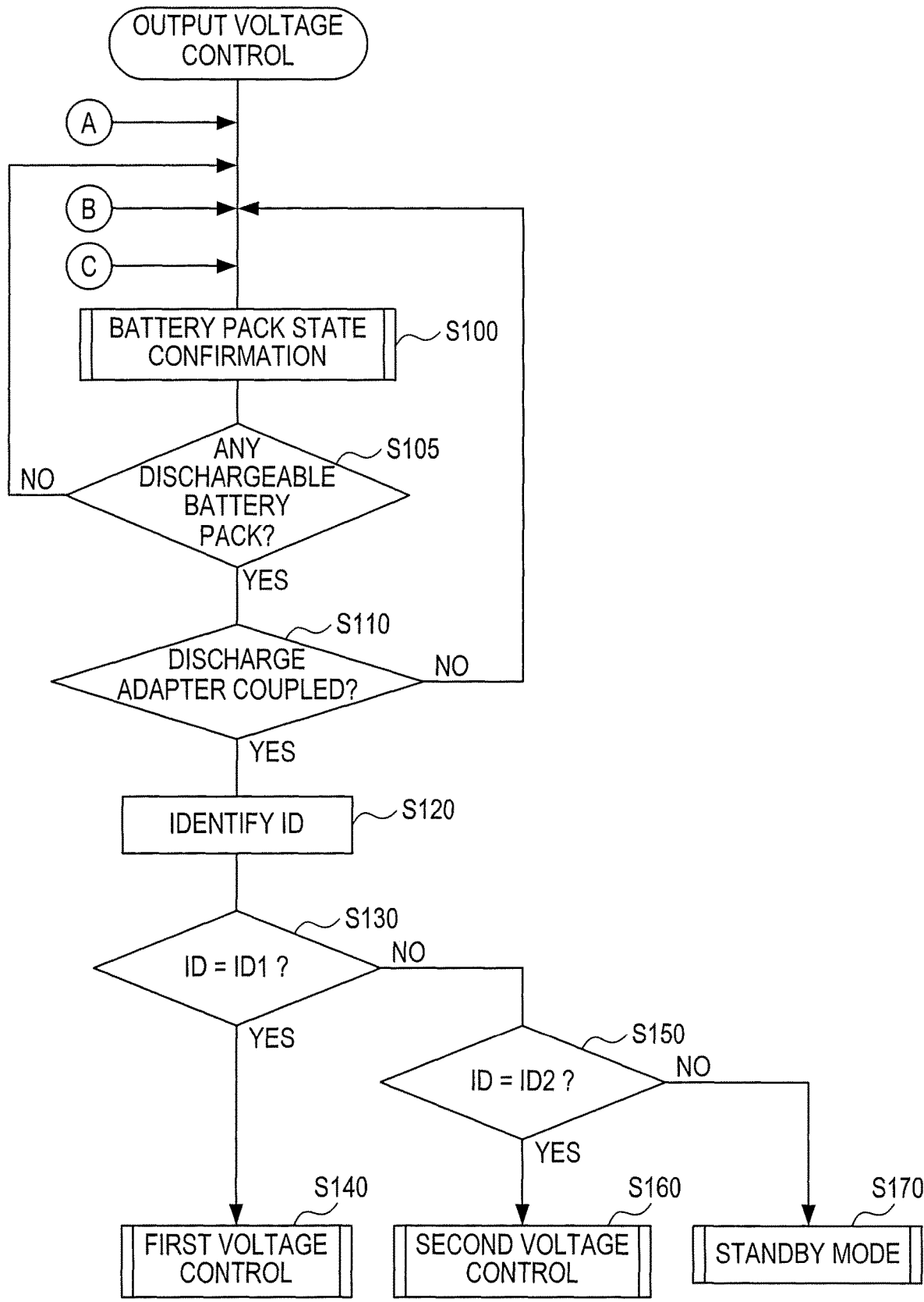
FIG. 11 is a flowchart illustrating details of an output voltage control process.

In response to manipulation of a startup switch (not shown) of the power supply device 310 by the user, the controller 31 starts the output voltage control process. A flowchart of the output voltage control process is shown in FIG. 11.

Upon a start of the output voltage control process, the controller 31 first performs the battery pack state confirmation process in S100 (S denotes a step) regarding each of the battery packs 33c1-33c4, 35c1-35c4 so as to determine whether all the battery packs 33c1-33c4, 35c1-35c4 respectively coupled to the battery pack connectors 33a1-33a4, 35a1-35a4 are in the dischargeable state. Since the battery pack state confirmation process performed for each battery pack is the same as the battery pack state confirmation process in the first embodiment, the detailed description thereof is not repeated.

S100 is a process to determine, regarding each of the battery packs 33c1-33c4, 35c1-35c4, whether all the battery packs 33c1-33c4, 35c1-35c4 respectively coupled to the battery pack connectors 33a1-33a4, 35a1-35a4 are in the dischargeable state.

The controller 31 outputs a dummy command signal SAin to each of the battery packs 33c1-33c4, 35c1-35c4. When the battery packs 33c1-33c4, 35c1-35c4 receive the dummy command signal SAin, it is determined whether the battery packs 33c1-33c4, 35c1-35c4 are each in the dischargeable state. If being in the dischargeable state, the battery packs 33c1-33c4, 35c1-35c4 each output the discharge permission signal SAout to the controller 31. Thus, the controller 31 can determine whether the battery packs 33c1-33c4, 35c1-35c4 are each in the dischargeable state by determining whether the discharge permission signal SAout is inputted.

When transmitting the dummy command signal SAin to each of the battery packs 33c1-33c4, 35c1-35c4, the controller 31 transmits the dummy command signal SAin by a parallel signal transmission process. The parallel signal transmission process is a process in which the dummy command signal SAin is concurrently transmitted to all the battery packs 33c1-33c4, 35c1-35c4.

The way to transmit the dummy command signal SAin to each of the battery packs 33c1-33c4, 35c1-35c4 is not limited to the way performed in the parallel signal transmission process, and a sequential signal transmission process may be used. The sequential signal transmission process is a process in which the dummy command signal is transmitted to each of the battery packs 33c1-33c4, 35c1-35c4 on a one-by-one basis in an order.

In a case where less than eight battery packs are connected to less than eight of the battery pack connectors 33a1-33a4, 35a1-35a4, the controller 31 checks whether the less than eight battery packs are each in the dischargeable state.

In the subsequent S105, the controller 31 determines whether there is any battery pack in the dischargeable state among the battery packs 33c1-33c4, 35c1-35c4 coupled to the battery pack connectors 33a1-33a4, 35a1-35a4. If the controller 31 makes an affirmative determination, the process proceeds to S110. If the controller 31 makes a negative determination, the process returns to S100.

If no battery pack is in the dischargeable state, the controller 31 repeats S100 and S105 while waiting for a battery pack in the dischargeable state to be attached.

If an affirmative determination is made in S105 and the process proceeds to S110, the controller 31 determines whether the discharge adapter 320 is coupled to the output connector 313. In response to an affirmative determination, the process proceeds to S120. In response to a negative determination, the process proceeds to S100.

If an affirmative determination is made in S110 and the process proceeds to S120, the controller 31 acquires the identifier information ID from the discharge adapter 320. As the identifier information ID, there are the first identifier information ID1 and the second identifier information ID2 in the present embodiment as described above.

In the subsequent S130, the controller 31 determines whether the acquired identifier information ID is the first identifier information ID1. In response to an affirmative determination, the process proceeds to S140 and the controller 31 performs the first voltage control process. In response to a negative determination, the process proceeds to S150.

In response to a negative determination in S130 and the process proceeds to S150, the controller 31 determines whether the acquired identifier information ID is the second identifier information ID2. In response to an affirmative determination, the process proceeds to S160 and the controller 31 performs the second voltage control process. In response to a negative determination, the process proceeds to S170 and the controller 31 performs a standby mode process.

Figure 12:
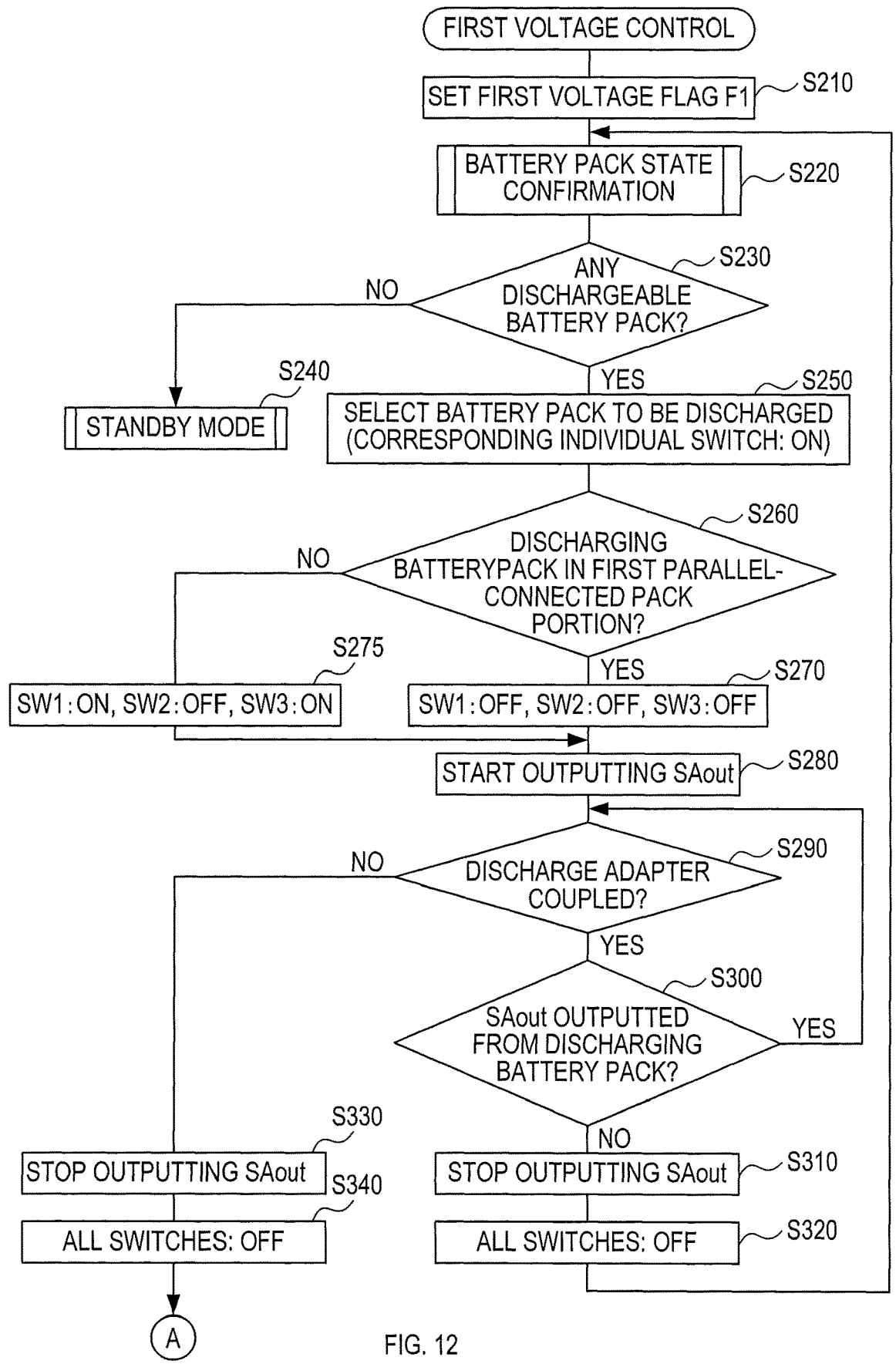
FIG. 12 is a flowchart illustrating details of a first voltage control process.

The following describes the details of the first voltage control process (S140) with reference to the flowchart in FIG. 12.

Upon a start of the first voltage control process, the controller 31 first sets a first voltage flag F1 in S210.

In the subsequent S220, the controller 31 performs the same process as that in S100 to determine whether the battery packs 33c1-33c4 connected in the first parallel-connected pack portion 33 and the battery packs 35c1-35c4 connected in the second parallel-connected pack portion 35 are in the dischargeable state.

In the subsequent S230, the controller 31 determines whether there is any battery pack in the dischargeable state among the connected battery packs 33c1-33c4, 35c1-35c4. In response to an affirmative determination, the process proceeds to S250. In response to a negative determination, process proceeds to S240 and the controller 31 performs the standby mode process.

If an affirmative determination is made in S230 and the process proceeds to S250, the controller 31 selects a battery pack to be discharged from among the battery packs 33c1-33c4, 35c1-35c4. At this time, the battery pack having the most remaining power (or the battery pack having the highest output voltage) is selected as the battery pack to be discharged. The controller 31 turns on one of the individual switches 33b1-33b4, 35b1-35b4 corresponding to the battery pack to be discharged and turns off other individual switches.

In the subsequent S260, the controller 31 determines whether the battery pack to be discharged is connected in the first parallel-connected pack portion 33. In response to an affirmative determination, the process proceeds to S270. In response to a negative determination, the process proceeds to S275. That is, the controller 31 determines in S260 whether the battery pack to be discharged is connected in the first parallel-connected pack portion 33 or in the second parallel-connected pack portion 35.

In S270, the controller 31 controls the output voltage switch 37 so that all the first switch SW1, the second switch SW2, and the third switch SW3 are turned off. Accordingly, one of the battery packs 33c1-33c4 connected in the first parallel-connected pack portion 33 is discharged enabling voltage output through the output connector 313.

In S275, the controller 31 controls the output voltage switch 37 so that the first switch SW1 and the third switch SW3 are turned on and the second switch SW2 is turned off. Accordingly, one of the battery packs 35c1-35c4 connected in the second parallel-connected pack portion 35 is discharged enabling voltage output through the output connector 313.

In the subsequent S280, the controller 31 starts externally outputting the discharge permission signal SAout through the permission signal output terminal 313e.

In the subsequent S290, the controller 31 determines whether the discharge adapter 320 is coupled. In response to an affirmative determination, the process proceeds to S300. In response to a negative determination, the process proceeds to S330.

In S300, the controller 31 determines whether the discharge permission signal SAout is outputted from the discharging battery pack (the battery pack selected in S250). In response to an affirmative determination, the process returns to S290. In response to a negative determination, the process proceeds to S310. The battery pack outputs the discharge permission signal SAout to the controller 31 when being in the dischargeable state. The battery pack stops outputting the discharge permission signal SAout to the controller 31 when being changed to the non-dischargeable state. Examples of the non-dischargeable state include a non-dischargeable state due to a shortage of the remaining power, and a non-dischargeable state due to a temperature increase of the battery pack.

In S310, the controller 31 stops externally outputting the discharge permission signal SAout through the permission signal output terminal 313e. In the subsequent S320, the controller 31 controls the output voltage switch 37 (the first switch SW1, the second switch SW2, and the third switch SW3), and all the individual switches 33b1-33b4, 35b1-35b4 to be turned off. When the controller 31 completes the processing in S320, the process returns to S220.

If an negative determination is made in S290 and the process proceeds to S330, the controller 31 stops externally outputting the discharge permission signal SAout through the permission signal output terminal 313e. In the subsequent S340, the controller 31 controls the output voltage switch 37 (the first switch SW1, the second switch SW2, and the third switch SW3), and all the individual switches 33b1-33b4, 35b1-35b4 to be turned off. Upon completion of the processing in S340, the controller 31 finishes the first voltage control process and the process returns to S110.

Figure 13:
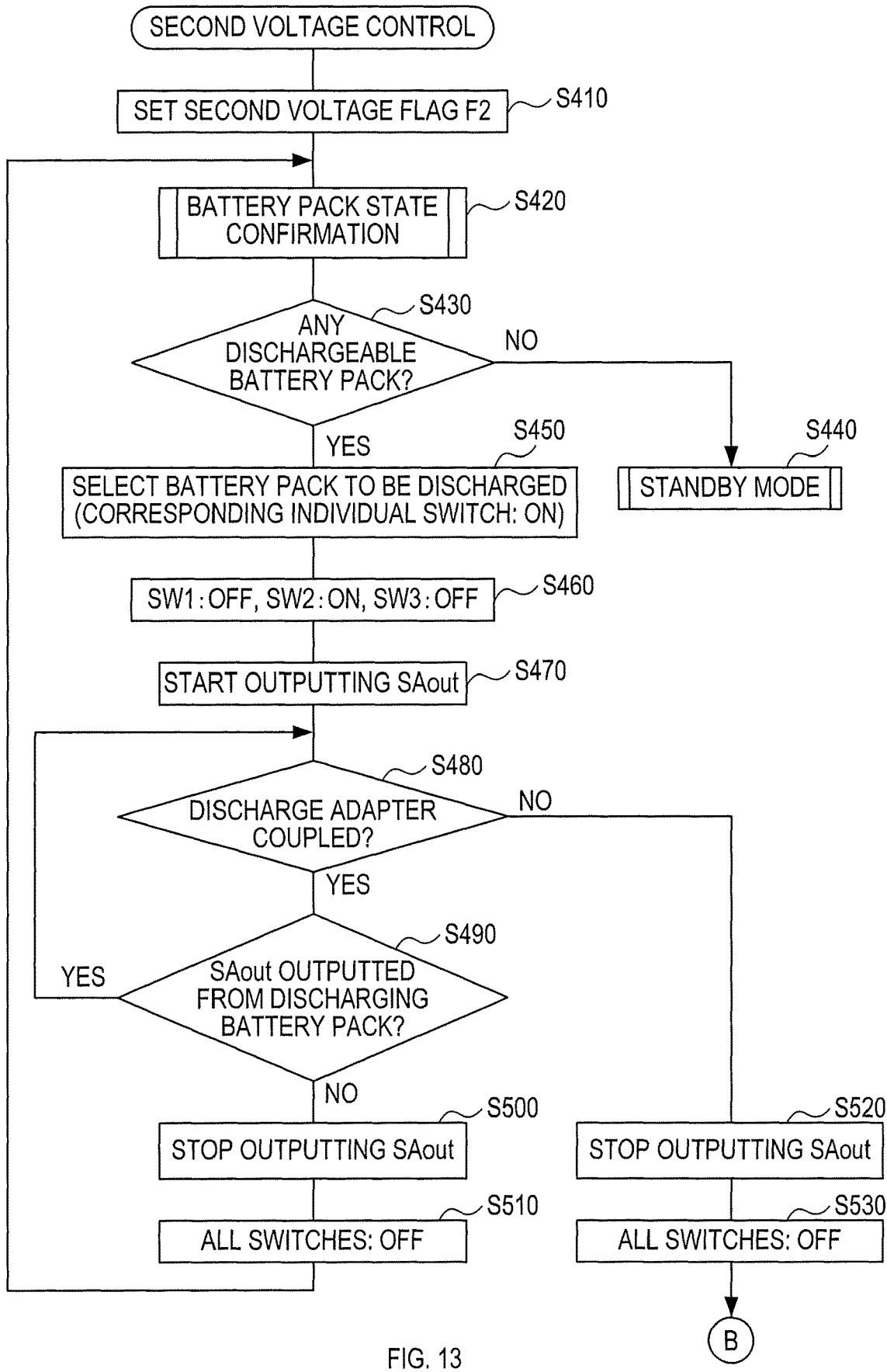
FIG. 13 is a flowchart illustrating details of a second voltage control process.

The following describes the details of the second voltage control process (S160) with reference to the flowchart in FIG. 13.

Upon a start of the second voltage control process, the controller 31 first sets a second voltage flag F2 in S410.

In the subsequent S420, the controller 31 performs the same processing as that in S100 to check whether the battery packs 33c1-33c4 connected in the first parallel-connected pack portion 33 and the battery packs 35c1-35c4 connected in the second parallel-connected pack portion 35 are in the dischargeable state.

In the subsequent S430, the controller 31 determines whether there is any battery pack among the connected battery packs 33c1-33c4, 35c1-35c4 in the dischargeable state. In response to an affirmative determination, the process proceeds to S450. In response to a negative determination, the process proceeds to S440 and the controller 31 performs the standby mode process.

If an affirmative determination is made in S430 and the process proceeds to S450, the controller 31 selects one battery pack to be discharged from among the battery packs 33c1-33c4 connected in the first parallel-connected pack portion 33, and selects one battery pack to be discharged from among the battery packs 35c1-35c4 connected in the second parallel-connected pack portion 35. At this time, battery packs having the most remaining power (or the battery packs having the highest output voltages) in the respective parallel-connected pack portions 33 and 35 are selected to be the battery packs to be discharged. The controller 31 controls the individual switches among the individual switches 33b1-33b4, 35b1-35b4 respectively corresponding to the battery packs to be discharged to be turned on, and controls other individual switches to be turned off.

In the subsequent S460, the controller 31 controls the output voltage switch 37 so that the first switch SW1 and the third switch SW3 are turned off, and the second switch SW2 is turned on. Accordingly, one of the battery packs 33c1-33c4 connected in the first parallel-connected pack portion 33 and one of the battery packs 35c1-35c4 connected in the second parallel-connected pack portion 35 are discharged, enabling voltage output through the output connector 313.

In the subsequent S470, the controller 31 starts externally outputting the discharge permission signal SAout through the permission signal output terminal 313e.

In the subsequent S480, the controller 31 determines whether the discharge adapter 320 is coupled. In response to an affirmative determination, the process proceeds to S490. In response to a negative determination, the process proceeds to S520.

In S490, the controller 31 determines whether the discharge permission signal SAout is outputted from both of the two discharging battery packs (the two battery packs selected in S450). In response to an affirmative determination, the process returns to S480. In response to a negative determination, the process proceeds to S500. If at least one of the two battery packs has stopped outputting the discharge permission signal SAout in S490, a negative determination is made.

In S500, the controller 31 stops externally outputting the discharge permission signal SAout through the permission signal output terminal 313e. In the subsequent S510, the controller 31 controls the output voltage switch 37 (the first switch SW1, the second switch SW2, and the third switch SW3) and all the individual switches 33b1-33b4, 35b1-35b4 to be turned off. When the controller 31 completes the processing in S510, the process returns to S420.

If a negative determination is made in S480 and the process proceeds to S520, the controller 31 stops externally outputting the discharge permission signal SAout through the permission signal output terminal 313e. In the subsequent S530, the controller 31 controls the output voltage switch 37 (the first switch SW1, the second switch SW2, and the third switch SW3) and all the individual switches 33b1-33b4, 35b1-35b4 to be turned off. When the controller 31 completes the processing in S530, the second voltage control process ends, and the process returns to S100.

Figure 14:
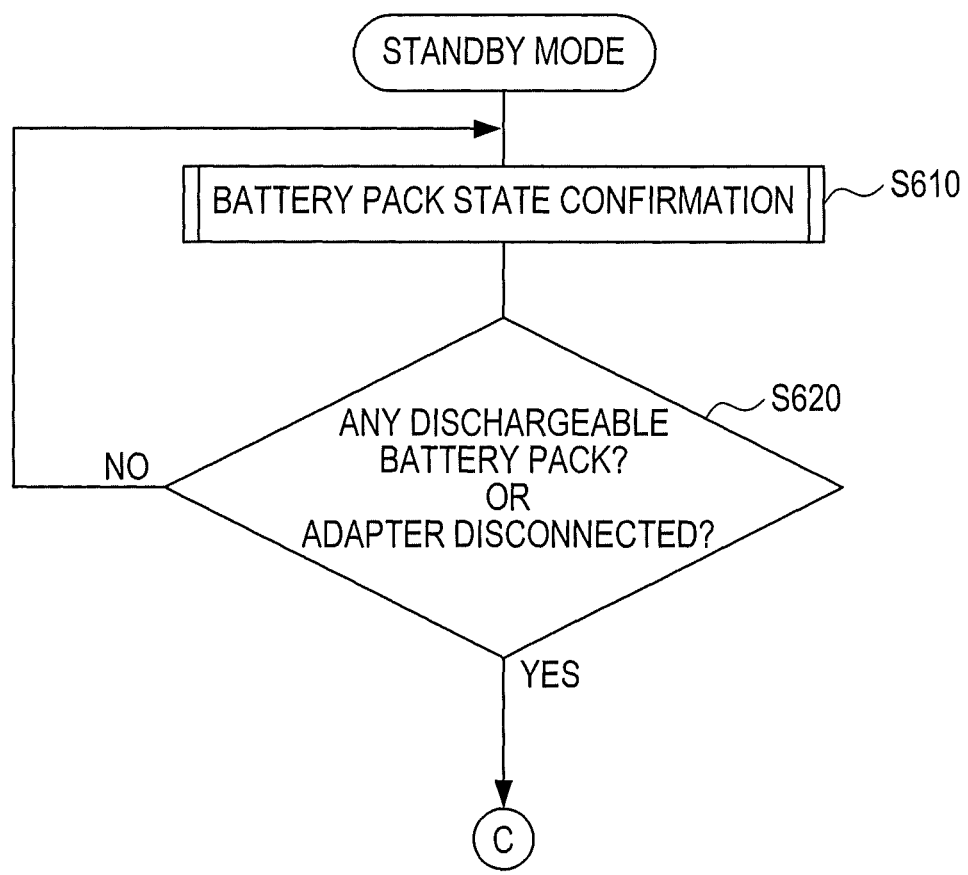
FIG. 14 is a flowchart illustrating details of a standby mode process.

The following describes the details of the standby mode process (S170, S240, and S440) with reference to the flowchart in FIG. 14.

Upon a start of the standby mode process, the controller 31 first performs in S610 the same processing as that in S100 to check whether the battery packs 33c1-33c4 connected in the first parallel-connected pack portion 33 and the battery packs 35c1-35c4 connected in the second parallel-connected pack portion 35 are in the dischargeable state.

In the subsequent S620, the controller 31 determines whether there is any battery pack among the connected battery packs 33c1-33c4, 35c1-35c4 in the dischargeable state, and whether the discharge adapter 320 is disconnected.

At this time, if there is a battery pack in the dischargeable state, or if the discharge adapter 320 is disconnected, the controller 31 makes an affirmative determination to end the standby mode process, and the process returns to S110. At this time, if there is no battery pack in the dischargeable state and the discharge adapter 320 is connected, the controller 31 makes a negative determination, and the process returns to S610.

Accordingly, by performing the output voltage control process, the power supply device 310 identifies the type of the connected discharge adapter 320 connected (the first voltage adapter 320a, the multi-output adapter 320b, or the second voltage adapter 320c) and outputs voltage through the output connector 313 in the state of voltage output corresponding to the type of the discharge adapter 320.

[2-5. Effects]

As described above, the power supply device 310 in the electric power supply system 301 according to the second embodiment includes the battery pack connectors 33a1-33a4, 35a1-35a4, and is configured such that the battery packs 33c1-33c4, 35c1-35c4 are detachably coupled.

The controller 31 of the power supply device 310 outputs (transmits) the dummy command signal SAin to all the battery packs 33c1-33c4, 35c1-35c4 respectively coupled to the battery pack connectors 33a1-33a4, 35a1-35a4 (in S100, S220, S420, and S610).

This enables the power supply device 310 to acquire the results of determination whether all the connected battery packs 33c1-33c4, 35c1-35c4 are in the dischargeable state.

Moreover, the controller 31 is configured to repeat the battery pack state confirmation process (in S100, S220, S420, and S610), and, thus when a fresh battery pack is connected to a non-connected battery pack connector among the battery pack connectors 33a1-33a4, 35a1-35a4, to transmit the dummy command signal SAin to the newly connected battery pack. In other words, when a fresh battery pack is connected to a non-connected battery pack connector among the battery pack connectors 33a1-33a4, 35a1-35a4, the controller 31 can transmit the dummy command signal SAin to the newly connected battery pack in addition to the battery packs to which the dummy command signal SAin has been transmitted.

Accordingly, when a fresh battery pack is connected to a non-connected battery pack connector among the battery pack connectors 33a1-33a4, 35a1-35a4, the power supply device 310 can promptly acquire the result of determination whether the newly connected battery pack is in the dischargeable state. This enables the power supply device 310 to shorten the length of time required until power supply with the newly connected battery pack is performed.

Moreover, when transmitting the dummy command signal SAin to each of the battery packs 33c1-33c4, 35c1-35c4, the controller 31 transmits the dummy command signal SAin by the parallel signal transmission process. In other words, the controller 31 is configured to transmit the dummy command signal SAin by the parallel signal transmission process, which thus enables the power supply device 310 to acquire the results of determination in a short period of time regarding whether all the battery packs 33c1-33c4, 35c1-35c4 are in the dischargeable state.

When transmitting the dummy command signal SAin to each of the battery packs 33c1-33c4, 35c1-35c4, the controller 31 may transmit the dummy command signal SAin by the sequential signal transmission process. In this case, the power supply device 310 can acquire the results of determination whether the battery packs 33c1-33c4, 35c1-35c4 are each in the dischargeable state while inhibiting a significant increase of the processing load in the controller 31.

Moreover, as described above, the power supply device 310 of the electric power supply system 301 according to the second embodiment outputs the voltages using the battery packs 33c1-33c4, 35c1-35c4 coupled to more than one (four or more) of the battery pack connectors 33a1-33a4, 35a1-35a4 through the output connector 313. The battery packs 33c1-33c4, 35c1-35c4 are categorized into two groups, namely the first parallel-connected pack portion 33 and the second parallel-connected pack portion 35. The power supply device 310 is configured to fix the coupling configuration (make the coupling configuration unchangeable) between the first parallel-connected pack portion 33 and the output connector 313 (the ground output terminal 313a, and the first positive output terminal 313b), while changing the coupling configuration between the second parallel-connected pack portion 35 and the output connector 313 (the ground output terminal 313a, the first positive output terminal 313b, and the second positive output terminal 313c).

As compared to the coupling configurations in which more than one (four or more) battery pack and output device (output connector) are changed in various patterns, the above-described configuration can reduce the number of patters of the coupling configurations, which in turn simplifies the configuration of the output voltage switch 37. Such configuration of the power supply device 310 can thus inhibit an increase in cost of the output voltage switch 37.

Moreover, by determining the state of voltage that is required to be outputted through the output connector 313 and controlling the output voltage switch 37 based on the determination result, the controller 31 can change more than one state of voltage output. Thus, a suitable state of voltage output can be achieved corresponding to the use.

Accordingly, the configuration of the aforementioned power supply device 310 for changing more than one state of voltage output can be simplified, which in turn inhibits an increase in cost.

[2-6. Corresponding Relations of Terms]

The following explains the corresponding relations of the terms in the present embodiment.

The electric power supply system 301, the first electric apparatus 40a, the second electric apparatus 40b, and the third electric apparatus 40c correspond to one example of the job-site electric system of the present disclosure. The electric power supply system 301 (the power supply device 310 and the discharge adapter 320) corresponds to one example of the power supply device of the present disclosure. The first electric apparatus 40a, the second electric apparatus 40b, and the third electric apparatus 40c correspond to one example of the electric working machine of the present disclosure.

The battery packs 33c1-33c4, each correspond to one example of the first battery pack of the present disclosure. The battery packs 35c1-35c4 each correspond to one example of the second battery pack of the present disclosure. The battery accommodating body 310a corresponds to one example of the power source controller of the present disclosure.

The battery pack connectors 33a1-33a4 each correspond to one example of the first battery pack connector of the present disclosure. The battery pack connectors 35a1-35a4 each correspond to one example of the second battery pack connectors of the present disclosure. The discharge adapter 320 (specifically, the apparatus side devices 25a, 25b, 25c) corresponds to one example of the working machine connector of the present disclosure. The controller 31 corresponds to one example of the power supply control device of the present disclosure. The identifier information ID (the first identifier information ID1, and the second identifier information ID2) corresponds to one example of the power supply command signal of the present disclosure.

3. Other Embodiments

Embodiments of the present disclosure have been described hereinabove. Nevertheless, the present disclosure is not limited to the aforementioned embodiments. The present disclosure can be embodied in various forms without departing from the gist of the present disclosure.

(3a) The above has described the first embodiment in which one battery pack is detachably coupled and, the second embodiment in which eight battery packs are detachably coupled. Nevertheless, the number of battery packs that can be detachably coupled is not limited to the aforementioned numbers, and any number of battery packs may be used.

(3b) In the power supply device according to the present disclosure, the rated output voltage of the battery packs attached (or to be attached) is not limited to 18 V. The power supply device may be configured such that battery pack(s) having other rated output voltage besides 18 V can be attached. The power supply device according to the present disclosure may be configured such that a battery pack having the rated output voltage of, for example, 36 V is attached. In addition, if the electric working machine (electric apparatus) is configured such that more than one battery pack is attached, the configuration of the electric working machine is not limited to that of the above-described second electric apparatus 40b in which two 18 V battery packs can be attached. The electric working machine (electric apparatus) may be configured such that two 36 V battery packs can be attached. The power source controller to be coupled to the electric working machine configured as described above may include two 36 V output systems.

(3c) The configuration of the working machine connector of the power supply device according to the present disclosure is not limited to the configuration in which the working machine connector is directly coupled to the electric working machine. The working machine connector may be configured to be indirectly coupled to the electric working machine via other component(s).

(3d) Examples of the electric working machine include an electric hammer, an electric hammer drill, an electric drill, an electric driver, an electric wrench, an electric reciprocating saw, an electric jigsaw, an electric cutter, an electric chainsaw, an electric planer, an electric tacker, an electric nail gun, an electric hedge trimmer, an electric lawn mower, an electric grass trimmer, an electric bush/grass cutter, an electric cleaner, an electric blower, and a grinder.

(3e) Functions of one component in the aforementioned embodiments may be distributed to two or more components. Functions of two or more components may be integrated and achieved by one component. At least a part of the configurations of the aforementioned embodiments may be replaced with known configurations having the same functions. A part of the configurations of the aforementioned embodiments may be omitted. At least a part of the configurations of aforementioned embodiments may be added to or replaced with other configurations of another one of the aforementioned embodiments. Any and all modes that are encompassed in the technical ideas identified by the languages in the claims are embodiments of the present disclosure.

What is claimed is:

1. A power source controller comprising:

a first battery pack connector configured to be coupled to a first battery pack, the first battery pack including a first rechargeable battery;
a working machine connector configured to be detachably coupled to an electric working machine, the electric working machine being configured to (i) transmit a power supply command signal, and (ii) be driven by an electric power of the first battery pack; and
a power supply control device configured to:
receive the power supply command signal from the electric working machine via the working machine connector to thereby supply the electric power of the first battery pack in a dischargeable state from the first battery pack connector to the electric working machine via the working machine connector; and
transmit a dummy command signal to the first battery pack via the first battery pack connector, the dummy command signal imitating the power supply command signal.

2. The power source controller according to claim 1, wherein the power supply control device is configured to continue to transmit the dummy command signal to the first battery pack.

3. The power source controller according to claim 2, wherein the power supply control device is configured to stop transmitting the dummy command signal to the first battery pack having transitioned from the dischargeable state to a non-dischargeable state.

4. The power source controller according to claim 3, wherein the power supply control device is configured to (i) stop transmitting the dummy command signal, (ii) wait a specified period of time, and (iii) resume transmitting the dummy command signal.

5. The power source controller according to claim 1 further comprising:
a second battery pack connector configured to be coupled to a second battery pack, the second battery pack including a second rechargeable battery,
wherein the power supply control device is configured to transmit the dummy respectively via the first battery pack connector and the second battery pack connector.

6. The power source controller according to claim 5, wherein the power supply control device is configured to (i) transmit the dummy command signal to the first battery pack, and (ii) subsequently transmit the dummy command signal to the second battery pack.

7. The power source controller according to claim 5, wherein the power supply control device is configured to selectively perform a parallel signal transmission process and a sequential signal transmission process,
the power supply control device is configured to concurrently transmit the dummy command signal to both of the first battery pack and the second battery pack in the parallel signal transmission process, and
the power supply control device is configured to sequentially transmit the dummy command signal to the first battery pack and the second battery pack in the sequential signal transmission process.

8. A power supply device comprising:
a battery pack including a rechargeable battery;
a battery pack connector configured to be coupled to the battery pack;
a working machine connector configured to be detachably coupled to an electric working machine, the electric working machine being configured to (i) transmit a power supply command signal, and (ii) be driven by an electric power of the first battery pack; and
a power supply control device configured to:
receive the power supply command signal from the electric working machine via the working machine connector to thereby supply the electric power of the battery pack in a dischargeable state from the battery pack connector to the electric working machine via the working machine connector; and
transmit a dummy command signal to the first battery pack via the battery pack connector, the dummy command signal imitating the power supply command signal.

9. A job-site electric system comprising:
a battery pack including a rechargeable battery;
an electric working machine configured to (i) output a power supply command signal, and (ii) be driven by an electric power of the battery pack;
a battery pack connector configured to be coupled to the battery pack;
a working machine connector configured to be detachably coupled to the electric working machine; and
a power supply control device configured to:
receive the power supply command signal from the electric working machine via the working machine connector to thereby supply the electric power of the battery pack in a dischargeable state from the battery pack connector to the electric working machine via the working machine connector; and
transmit a dummy command signal to the first battery pack via the battery pack connector, the dummy command signal imitating the power supply command signal.

10. A method for supplying an electric power of a battery pack to an electric working machine, the method comprising:
coupling the battery pack and the electric working machine to a power source controller;
receiving a power supply command signal from the electric working machine to thereby supply the electric power from the battery pack in a dischargeable state to the electric working machine through the power source controller; and
transmitting a dummy command signal from the power source controller to the battery pack, the dummy command signal imitating the power supply command signal.

11. The power source controller according to claim 1, further comprising:
a current conduction path configured to electrically connect the first battery pack connector to the working machine connector; and
a first switch on the current conduction path and configured to be switched between a conducting state and an interrupted state, the first switch in the conducting state being configured to complete the current conduction path, and the first switch in the interrupted state being configured to interrupt the current conduction path,
wherein the power supply control device is configured (i) to be electrically connected to the first switch and (ii) to output a first command signal to the first switch, and
the first command signal is to switch the first switch between the conducting state and the interrupted state.

12. The power source controller according to claim 11, further comprising:
a second switch (i) on the current conduction path, (ii) connected in series to the first switch, and (iii) configured to be switched between a conducting state and an interrupted state, the second switch in the conducting state being configured to complete the current conduction path, and the second switch in the interrupted state being configured to interrupt the current conduction path, wherein the power supply control device is configured (i) to be electrically connected to the second switch and (ii) to output a second command signal to the second switch, and the second command signal is to switch the second switch between the conducting state and the interrupted state.

13. The power source controller according to claim 1, wherein the power supply control device includes:
- a first signal input controller configured to receive a discharge permission signal from the first battery pack via the first battery pack connector, the discharge permission signal permitting the electric working machine a discharge from the first battery pack; and
- a power source device control circuit configured to control the first signal input controller to receive the discharge permission signal.

14. The power source controller according to claim 1, wherein the power supply control device includes:
- a second signal input controller configured to receive the power supply command signal from the electric working machine via the working machine connector; and
- a power source device control circuit configured to control the second signal input controller to receive the power supply command signal.

15. The power source controller according to claim 14, wherein the power supply control device includes a first signal output controller configured to transmit the dummy command signal to the first battery pack via the first battery pack connector, and the power source device control circuit is configured to control the first signal output controller to transmit the dummy command signal.

16. The power source controller according to claim 13, wherein the power supply control device includes a second signal output controller configured to output a dummy permission signal to the electric working machine via the working machine connector, the dummy permission signal imitating the discharge permission signal, and the power source device control circuit is configured to control the first signal output controller to transmit the dummy command signal.

* * * * *